US010963782B2

United States Patent
Xiong et al.

(10) Patent No.: US 10,963,782 B2
(45) Date of Patent: Mar. 30, 2021

(54) DYNAMIC COATTENTION NETWORK FOR QUESTION ANSWERING

(71) Applicant: salesforce.com, inc., San Francisco, CA (US)

(72) Inventors: Caiming Xiong, Palo Alto, CA (US); Victor Zhong, San Francisco, CA (US); Richard Socher, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 1025 days.

(21) Appl. No.: 15/421,193

(22) Filed: Jan. 31, 2017

(65) Prior Publication Data

US 2018/0129938 A1    May 10, 2018

Related U.S. Application Data

(60) Provisional application No. 62/418,060, filed on Nov. 4, 2016, provisional application No. 62/417,332, filed on Nov. 4, 2016.

(51) Int. Cl.
| | |
|---|---|
| *G06N 3/08* | (2006.01) |
| *G06N 5/04* | (2006.01) |
| *G06N 3/04* | (2006.01) |
| *G06N 5/02* | (2006.01) |

(52) U.S. Cl.
CPC ............. *G06N 3/08* (2013.01); *G06N 3/0445* (2013.01); *G06N 3/0454* (2013.01); *G06N 5/022* (2013.01); *G06N 5/04* (2013.01)

(58) Field of Classification Search
CPC ...... G06N 3/0445; G06N 3/0454; G06N 3/08; G06N 5/022; G06N 5/04
See application file for complete search history.

(56) References Cited

U.S. PATENT DOCUMENTS

| | | | |
|---|---|---|---|
| 10,282,663 B2 | 5/2019 | Socher et al. | |
| 10,346,721 B2 | 7/2019 | Albright et al. | |
| 2008/0306725 A1* | 12/2008 | Moore | G06F 17/2818 704/2 |
| 2016/0099010 A1* | 4/2016 | Sainath | G10L 25/30 704/232 |
| 2016/0350653 A1 | 12/2016 | Socher et al. | |
| 2017/0024645 A1 | 1/2017 | Socher et al. | |
| 2017/0032280 A1 | 2/2017 | Socher et al. | |

(Continued)

OTHER PUBLICATIONS

Lu et. al., "Hierarchical Question-Image Co-Attention for Visual Question Answering", Oct. 26, 2016 (Year: 2016).*

(Continued)

*Primary Examiner* — Li B. Zhen
*Assistant Examiner* — Selene A. Haedi
(74) *Attorney, Agent, or Firm* — Haynes and Boone, LLP

(57) ABSTRACT

The technology disclosed relates to an end-to-end neural network for question answering, referred to herein as "dynamic coattention network (DCN)". Roughly described, the DCN includes an encoder neural network and a coattentive encoder that capture the interactions between a question and a document in a so-called "coattention encoding". The DCN also includes a decoder neural network and highway maxout networks that process the coattention encoding to estimate start and end positions of a phrase in the document that responds to the question.

18 Claims, 18 Drawing Sheets

(56) References Cited

U.S. PATENT DOCUMENTS

| | | | | |
|---|---|---|---|---|
| 2017/0200077 | A1* | 7/2017 | Weston | G06N 3/084 |
| 2017/0300812 | A1* | 10/2017 | Ohsawa | G06N 3/08 |
| 2017/0372200 | A1* | 12/2017 | Chen | G06N 3/08 |
| 2018/0121785 | A1* | 5/2018 | Min | G06N 3/0454 |

OTHER PUBLICATIONS

Wang et. al., "Machine Comprehension Using Match-LSTM And Answer Pointer", Aug. 29, 2016 (Year: 2016).*

Wu et. al., "Google's Neural Machine Translation System: Bridging the Gap between Human and Machine Translation", Oct. 8, 2016 (Year: 2016).*

Srivastava et. al., "Training Very Deep Networks", 2015 (Year: 2015).*

Agrawal et al. "VQA: Visual Question Answering," Proceedings of the IEEE International Conference on Computer Vision. Oct. 27, 2016. pp. 1-25.

Berant et al. "Modeling Biological Processes for Reading Comprehension," Proceedings of the 2014 Conference on Empirical Methods in Natural Language Processing (EMNLP). Doha, Qatar. Oct. 25-29, 2014. pp. 1-12.

Besag, "On the Statistical Analysis of Dirty Pictures," Royal Statistical Society, at the meeting organized by the Research Section, Professor A.F.M. Smith. Department of Mathematical Sciences, University of Durham, Durham DH1 3LE, England. May 7, 1986. pp. 1-44.

Chen et al., "A Thorough Examination of the CNN/Daily Mail Reading Comprehension Task," Proceedings of the 54th Annual Meeting of the Association for Computational Linguistics. Berlin, Germany. Aug. 7-12, 2016. pp. 1-10.

Cui et al., "Attention-over-Attention Neural Networks for Reading Comprehension," Research Center for Social Computing and Information Retrieval, Harbin Institute of Technology, Harbin, China. Jul. 15, 2016. pp. 1-10.

Goodfellow et al., "Maxout Networks," Proceedings of the 30th International Conference on Machine Learning, Atlanta, Georgia, USA. 2013. pp. 1-9.

Hermann et al., "Teaching Machines to Read and Comprehend," Neural Information Processing Systems (NIPS) Proceedings of the 28th International Conference on Neural Information Processing Systems, vol. 1. Montreal, Canada. Dec. 7-12, 2015. pp. 1-9.

Hill et al., "The Goldilocks Principle: Reading Children's Books With Explicit Memory Representation." Published as a Conference paper at the International Conference on Learning Representations (ICLR). University of Cambridge, Computer Laboratory, UK. Apr. 1, 2016. https://arxiv.org/abs/1511.02301v4. pp. 1-9.

Hochreiter et al., "Long Short-Term Memory: Neural Computation," Neural Computation, vol. 9, Issue 8. Nov. 15, 1997. pp. 1-32.

Kadlec et al., "Text Understanding with the Attention Sum Reader Network," Proceedings of the 54th Annual Meeting of the Association for Computational Linguistics, Berlin, Germany. Aug. 7-12, 2016. pp. 1-11.

Kingma et al., "Adam: A Method for Stochastic Optimization," Published as a Conference paper at the International Conference on Learning Representations (ICLR). Dec. 22, 2014. https://arxiv.org/abs/1412.6980v1. pp. 1-15.

Kumar et al. "Ask Me Anything: Dynamic Memory Networks for Natural Language Processing," vol. 48: Proceedings of the International Conference on Machine Learning, New York, NY, USA. Jun. 24, 2015. pp. 1-10.

Lu et al., "Hierarchical Question-Image Co-Attention for Visual Question Answering," 30th Conference on Neural Information Processing Systems (NIPS 2016). Barcelona, Spain. 2016. pp. 1-9.

Luong et al., "Effective Approaches to Attention-Based Neural Machine Translation," Proceedings of the 2015 Conference on Empirical Methods in Natural Language Processing, Lisbon, Portugal. Sep. 17-21, 2015. pp. 1-10.

Manning et al., "The Stanford CoreNLP Natural Language Processing Toolkit," Proceedings of 52nd Annual Meeting of the Association for Computational Linguistics (ACL): System Demonstrations, Linguistics and Computer Science, Baltimore, Maryland. Jun. 2014. pp. 1-6.

Merity et al., "Pointer Sentinel Mixture Models," Published as a Conference paper at the International Conference on Learning Representations (ICLR). Sep. 26, 2016. https://arxiv.org/abs/1609.07843v1. pp. 1-13.

Pennington et al., "GloVe: Global Vectors for Word Representation," Proceedings of the 2014 Conference on Empirical Methods in Natural Language Processing (EMNLP). Doha, Qatar. Oct. 25-29, 2014. pp. 1-12.

Rajpurkar et al., "SQuAD: 100,000+ Questions for Machine Comprehension of Text," Proceedings of the 2016 Conference on Empirical Methods in Natural Language Processing. Austin, Texas. Nov. 1-5, 2016. pp. 1-10.

Richardson et al., "MCTest: A Challenge Dataset for the Open-Domain Machine Comprehension of Text," Proceedings of the 2013 Conference on Empirical Methods in Natural Language Processing. Seattle, Washington. Oct. 18-21, 2013. pp. 1-11.

Sordoni et al., "Iterative Alternating Neural Attention for Machine Reading," Maluuba Research, Montreal, Quebec. Jun. 10, 2016. https://arxiv.org/pdf/1606.02245.pdf. pp. 1-9.

Srivastava et al., "Dropout: A Simple Way to Prevent Neural Networks from Overfitting," Journal of Machine Learning Research. University of Toronto. Jun. 14, 2014. pp. 1-30.

Srivastava et al., "Highway Networks," Presented at ICML, Deep Learning Workshop, International Conference on Machine Learning. Lillie, France. Nov. 3, 2015. pp. 1-6.

Tokui et al., "Chainer: A Next-Generation Open Source Framework for Deep Learning," Preferred Networks. 2015. https://pdfs.semanticscholar.org/6715/6902beca9bc90b728c8d5dd4ac9d8b27d3a3.pdf. pp. 1-6.

Vinyals et al., "Pointer Networks," In Advances in Neural Information Processing Systems. Jan. 2, 2017. https://arxiv.org/abs/1506.03134v2. pp. 1-9.

Wang et al., "Machine Comprehension with Syntax, Frames, and Semantics," vol. 2, Proceedings of the 53rd Annual Meeting of the Association for Computational Linguistics. Beijing, China. Jul. 16, 2015. pp. 1-8.

Wang et al., "Machine Comprehension Using Match-LSTM and Answer Pointer." International Conference on Learning Representations, Toulon, France. Research Collection School of Information Systems. Apr. 24-26, 2017. pp. 1-16.

Wang et al., "Learning Natural Language Inference With LSTM." Proceedings of NAACL-HLT, Association for Computational Linguistics. San Diego, California. Jun. 12-17, 2016. pp. 1-10.

Wang et al., "A Long Short-Term Memory Model for Answer Sentence Selection in Question Answering," Proceedings of the 53rd Annual Meeting of the Association for Computational Linguistics and the 7th International Joint Conference on Natural Language Processing (vol. 2:Short Papers) Beijing, China, XP055447074. Jan. 26, 2015. pp. 1-6.

Xiong et al., "Dynamic Memory Networks for Visual and Textual Question Answering," Proceedings of the 33rd International Conference on Machine Learning, New York, NY, USA. JMLR: W&CP vol. 48. Mar. 4, 2016. pp. 1-10.

Xiong et al., "Dynamic Coattention Networks for Question Answering." Published as Conference Paper at the International Conference on Learning Representations (ICLR). Nov. 5, 2016. https://arxiv.org/abs/1611.01604v1. pp. 1-14.

Yu et al., End-to-End Answer Chunk Extraction and Ranking for Reading Comprehension. Oct. 31, 2016. https://arxiv.org/abs/1610.09996. pp. 1-7.

International Search Report issued by the International Searching Authority for PCT Application No. PCT/US2017/060026. pp. 1-3.

Written Opinion issued by the International Searching Authority for PCT Application No. PCT/US2017/060026. pp. 1-15.

International Preliminary Report on Patentability, dated May 7, 2019, from PCT/US2017/060026, pp. 1-16.

* cited by examiner

Start Highway Maxout Network 120

End Highway Maxout Network 122

FIG. 17

DYNAMIC COATTENTION NETWORK FOR QUESTION ANSWERING

CROSS REFERENCE TO OTHER APPLICATIONS

This application claims the benefit of U.S. Provisional Patent Application 62/417,332, "DYNAMIC COATTENTION NETWORKS FOR QUESTION ANSWERING", filed on Nov. 4, 2016. The priority provisional application is hereby incorporated by reference; and This application claims the benefit of U.S. Provisional Patent Application 62/418,060, "DYNAMIC COATTENTION NETWORKS FOR QUESTION ANSWERING", filed on Nov. 4, 2016. The priority provisional application is hereby incorporated by reference.

FIELD OF THE TECHNOLOGY DISCLOSED

The technology disclosed relates generally to natural language processing (NLP) using deep neural networks, and in particular relates to an end-to-end neural network architecture for machine comprehension and question answering.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Several deep learning models have been proposed for question answering. However, due to their single-pass nature, they have no way to recover from local maxima corresponding to incorrect answers. To address this problem, the technology disclosed provides a so-called "dynamic coattention network (DCN)" for question answering. The DCN first fuses codependent representations of a question and a document in order to focus on relevant parts of both. Then, the DCN iterates over potential answer spans. This iterative procedure enables the DCN to recover from initial local maxima corresponding to incorrect answers.

On the Stanford Question Answering Dataset (SQuAD) dataset, a single DCN model outperforms the previous state of the art from 71.0% F1 score to 75.9% F1 score, while an ensemble DCN model outperforms the previous state of the art from 78.1% F1 score to 80.4% F1 score.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIGS. 15, 16 and 17 are examples of start and end conditional distributions produced by the decoder neural network.

DETAILED DESCRIPTION

Figure 1:
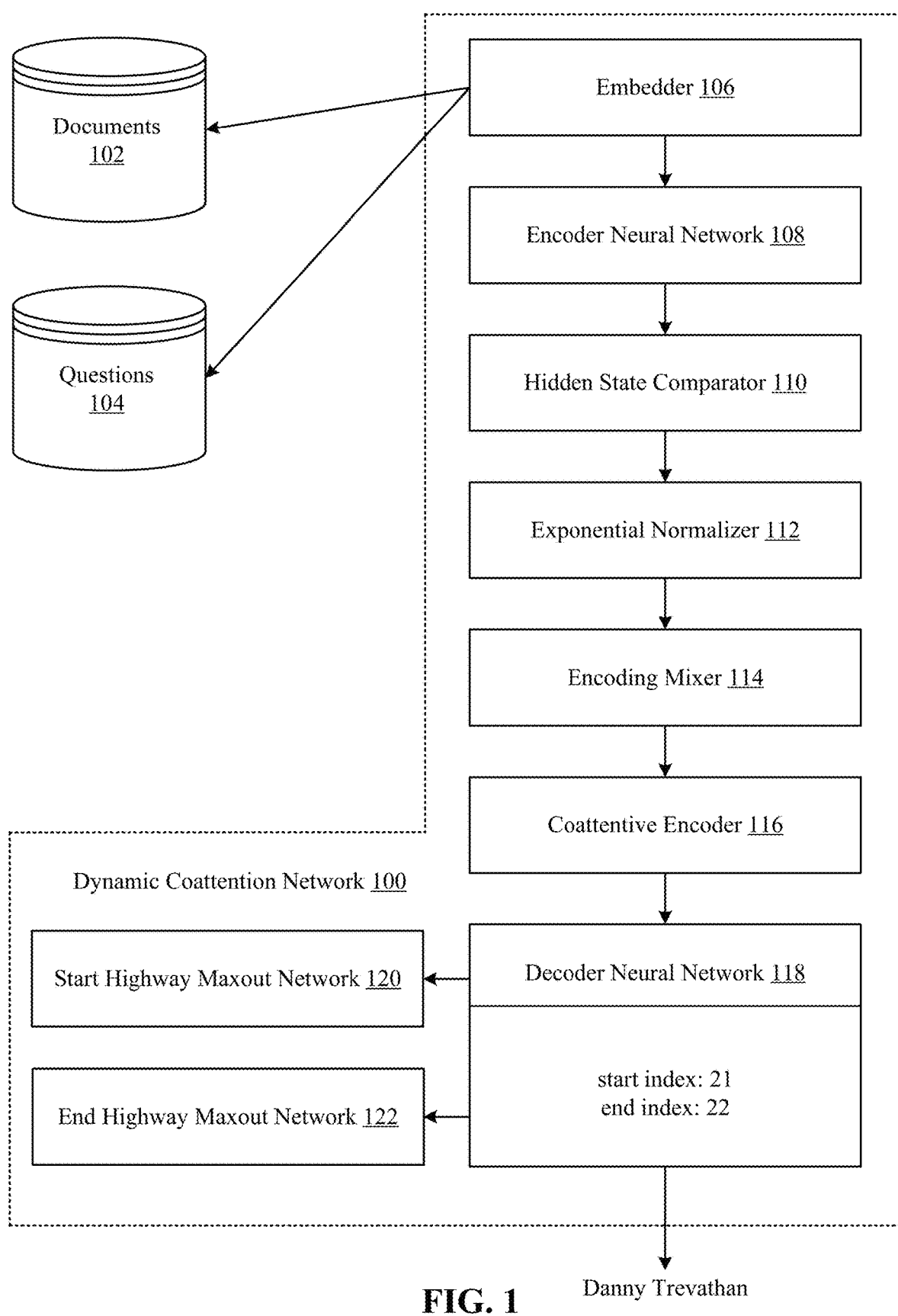
FIG. 1 illustrates aspects of a dynamic coattention network (DCN) that reads and comprehends a document and answers a question based on it.
Figure 2:
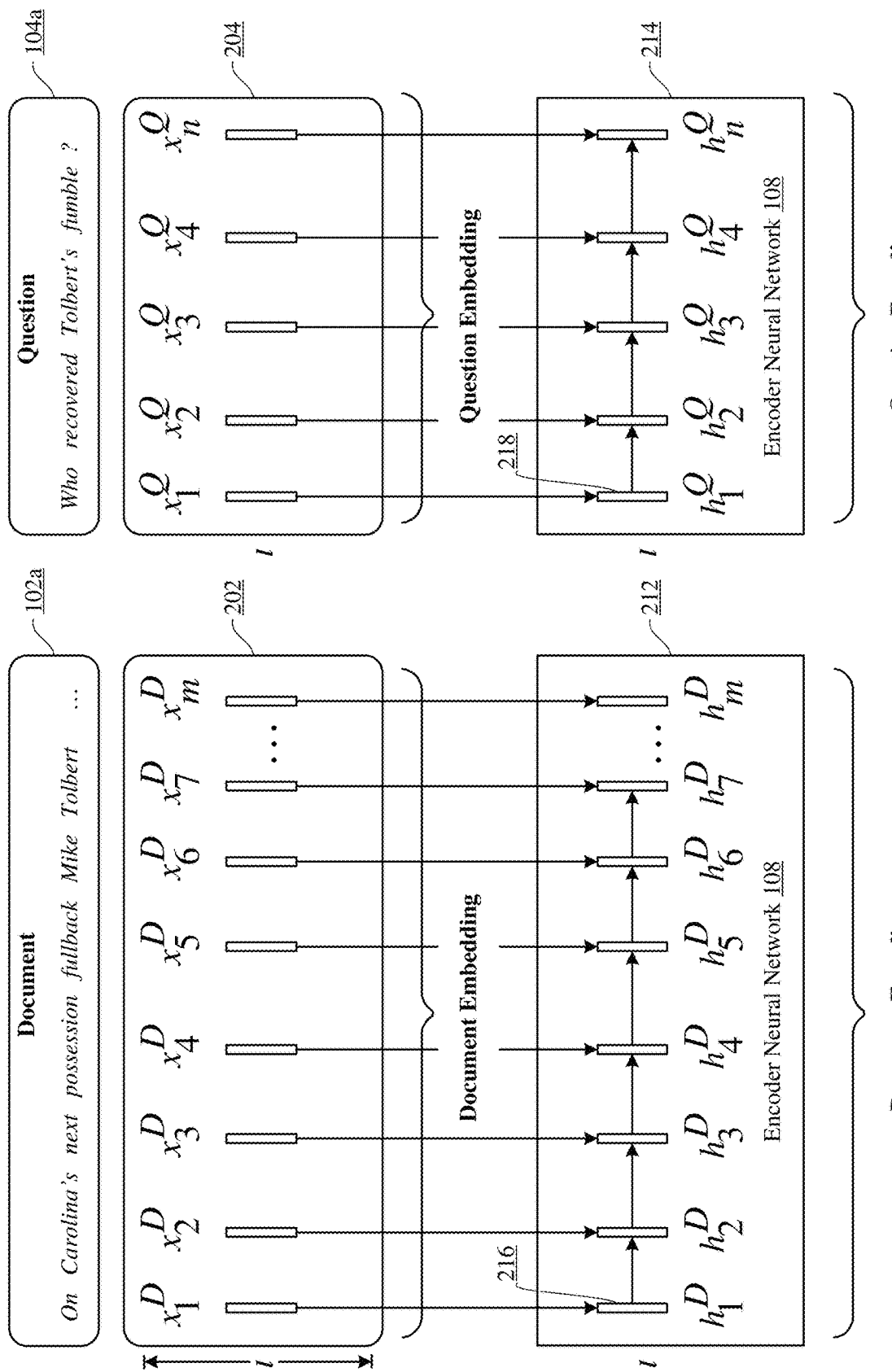
FIG. 2 shows one implementation of producing document and question contextual encodings using an encoder neural network.
Figure 3:
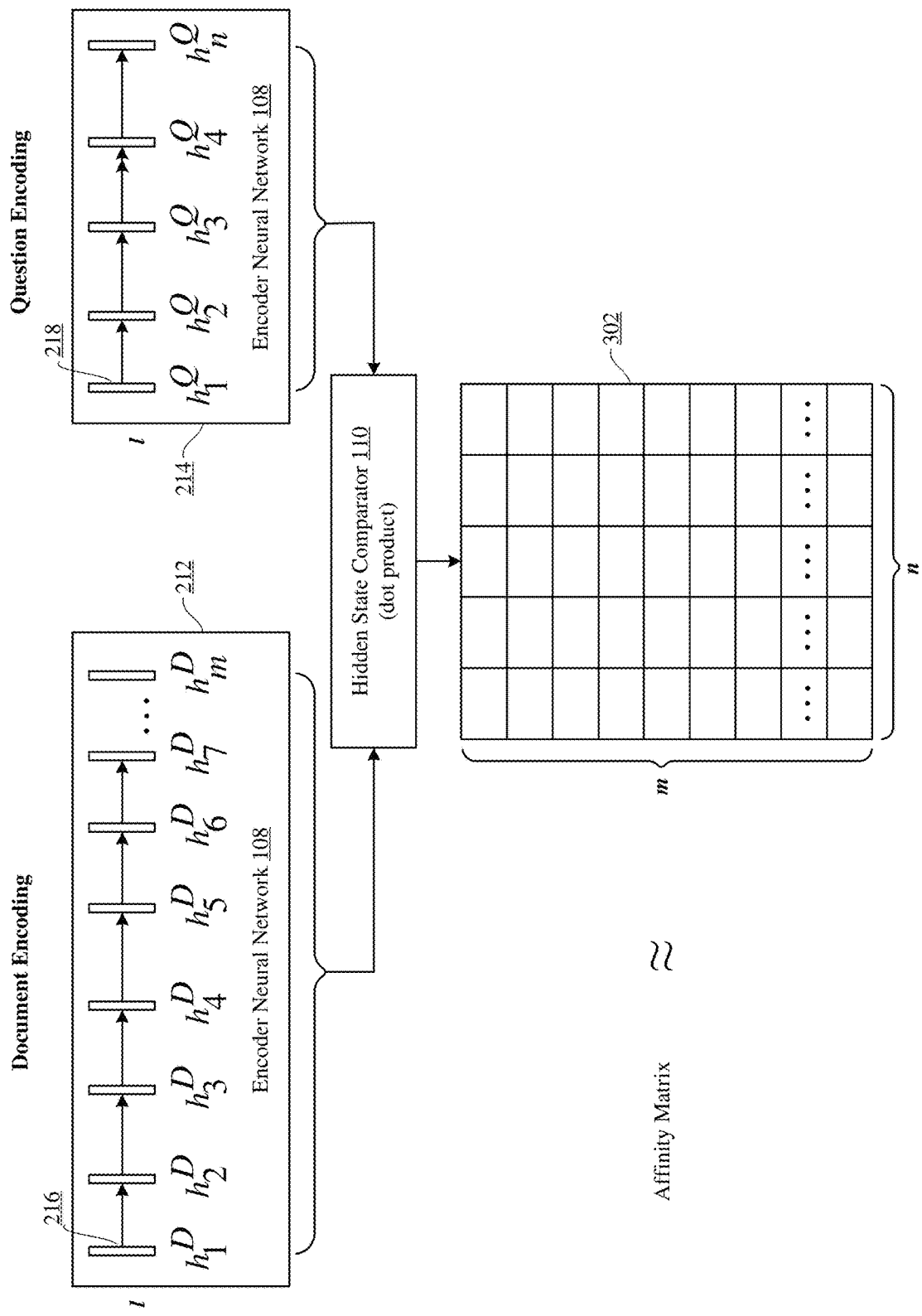
FIG. 3 depicts one implementation of a hidden state comparator, which produces an affinity matrix that determines linguistic similarity between the document and question contextual encodings of FIG. 2.
Figure 4:
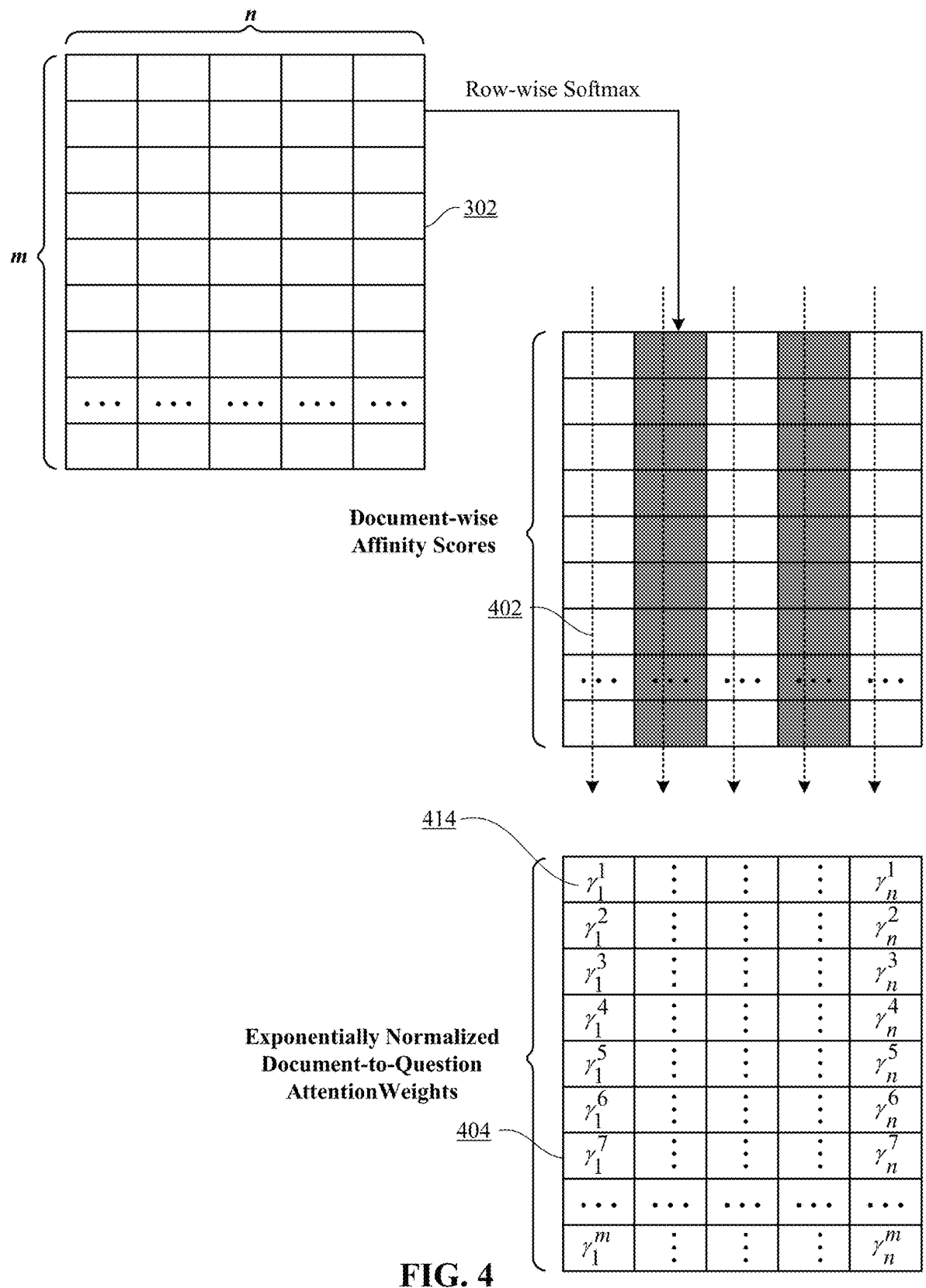
FIG. 4 is one implementation of producing document-to-question attention weights by document-wise normalizing the affinity matrix of FIG. 3.
Figure 5:
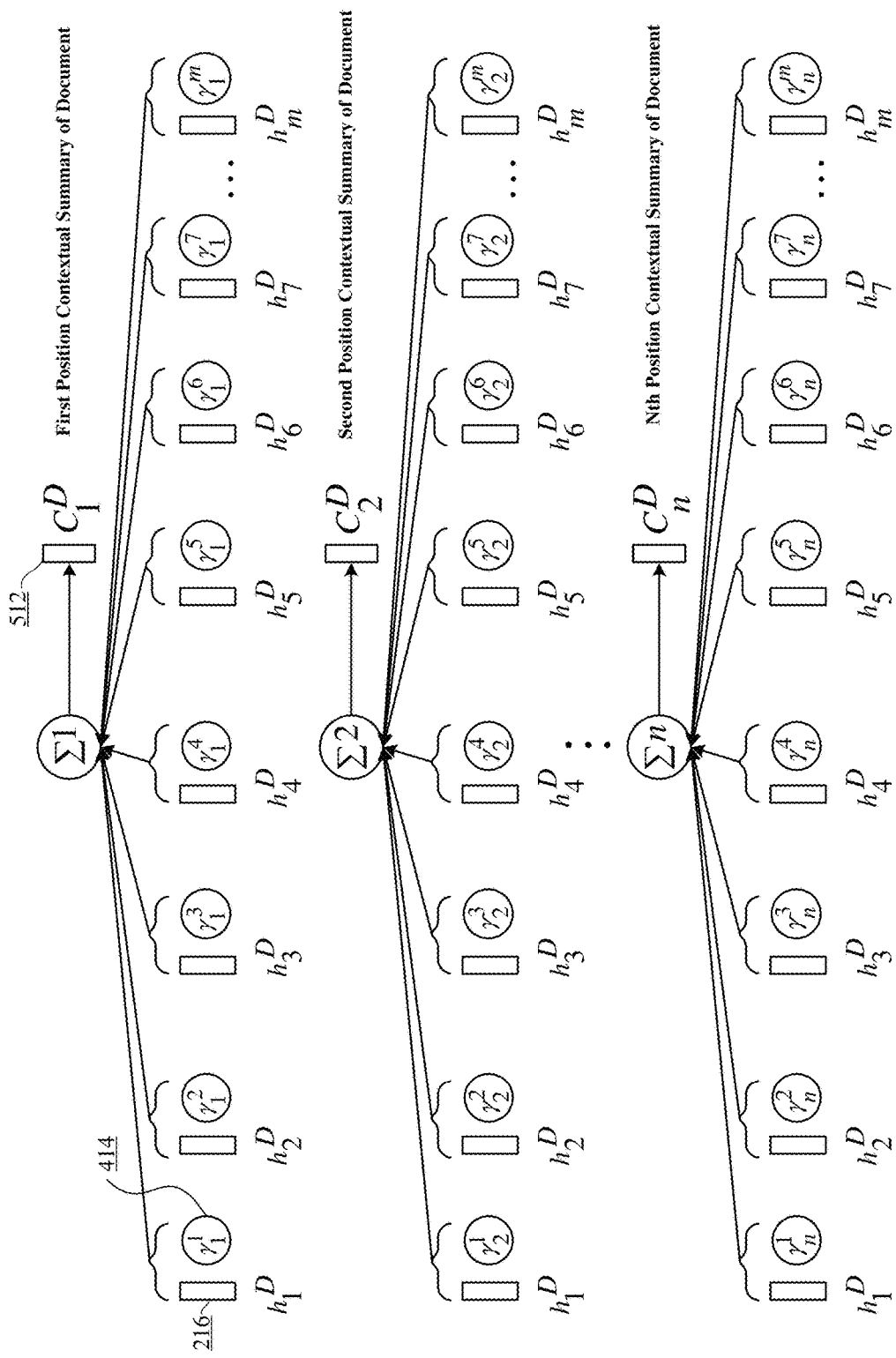
FIG. 5 illustrates one implementation of generating contextual summaries of the document by combining FIG. 2's document contextual encoding with FIG. 4's document-to-question attention weights.
Figure 6:
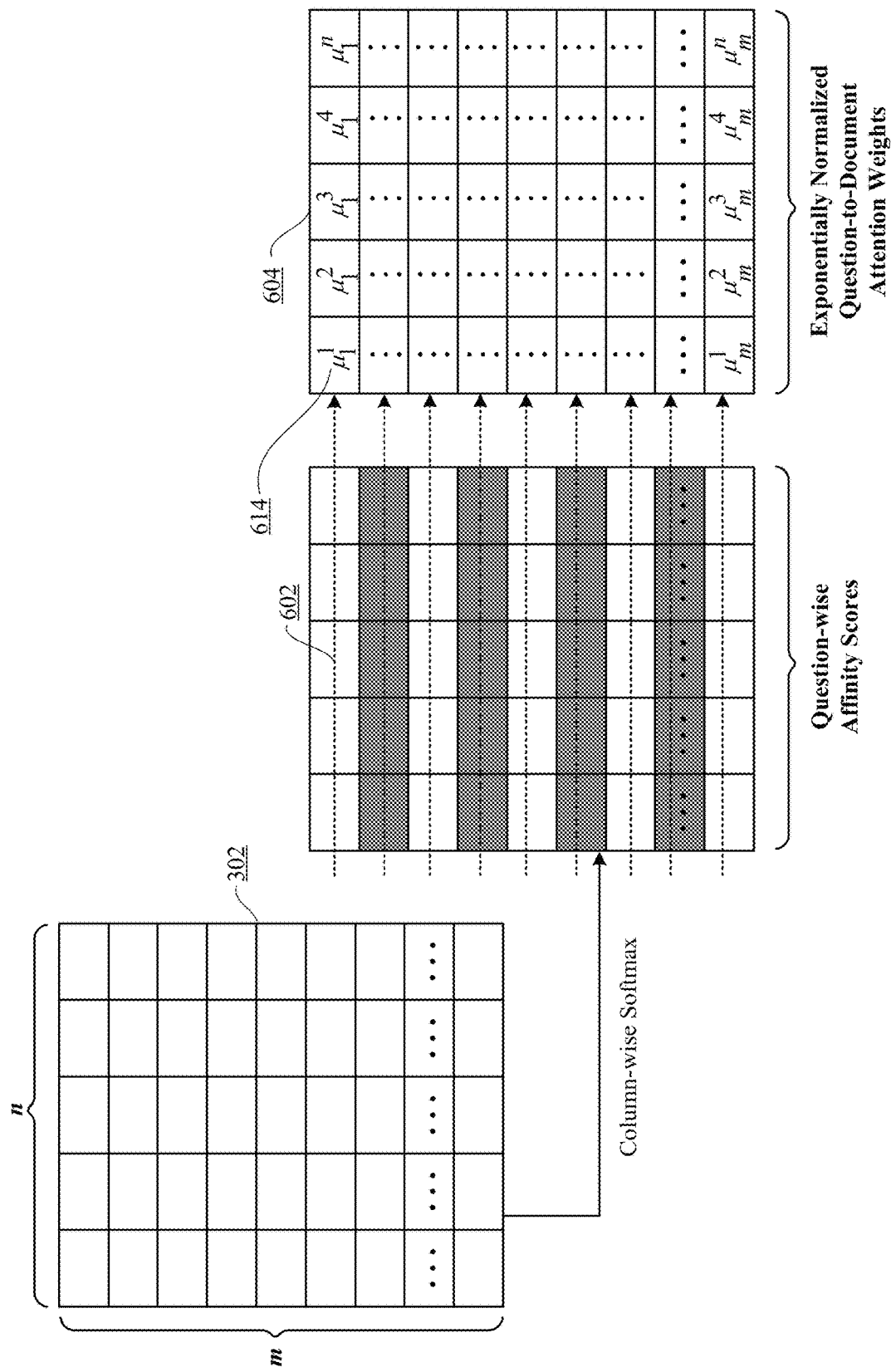
FIG. 6 is one implementation of producing question-to-document attention weights by question-wise normalizing the affinity matrix of FIG. 3.
Figure 7:
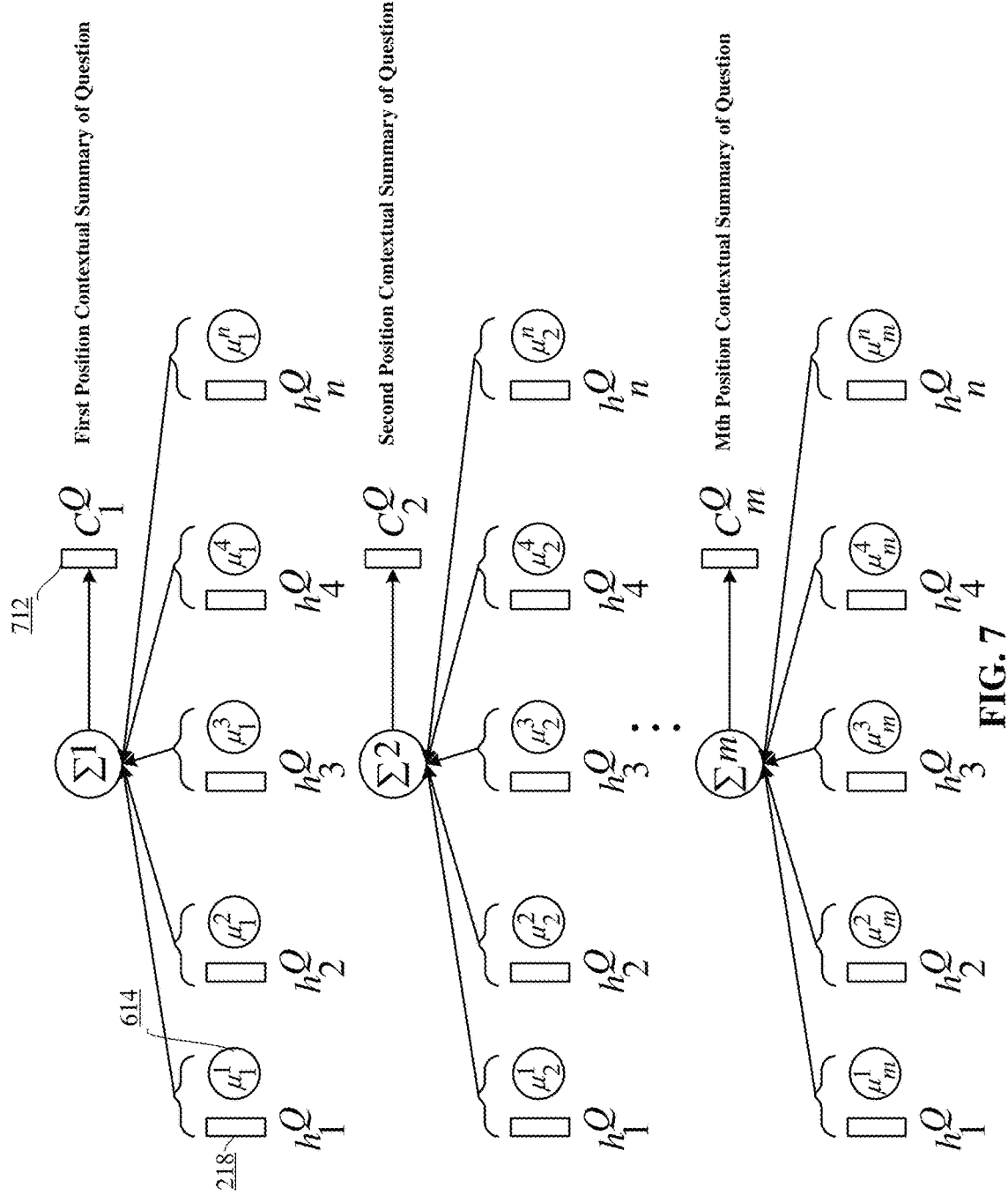
FIG. 7 illustrates one implementation of generating contextual summaries of the question by combining FIG. 2's question contextual encoding with FIG. 6's question-to-document attention weights.
Figure 8:
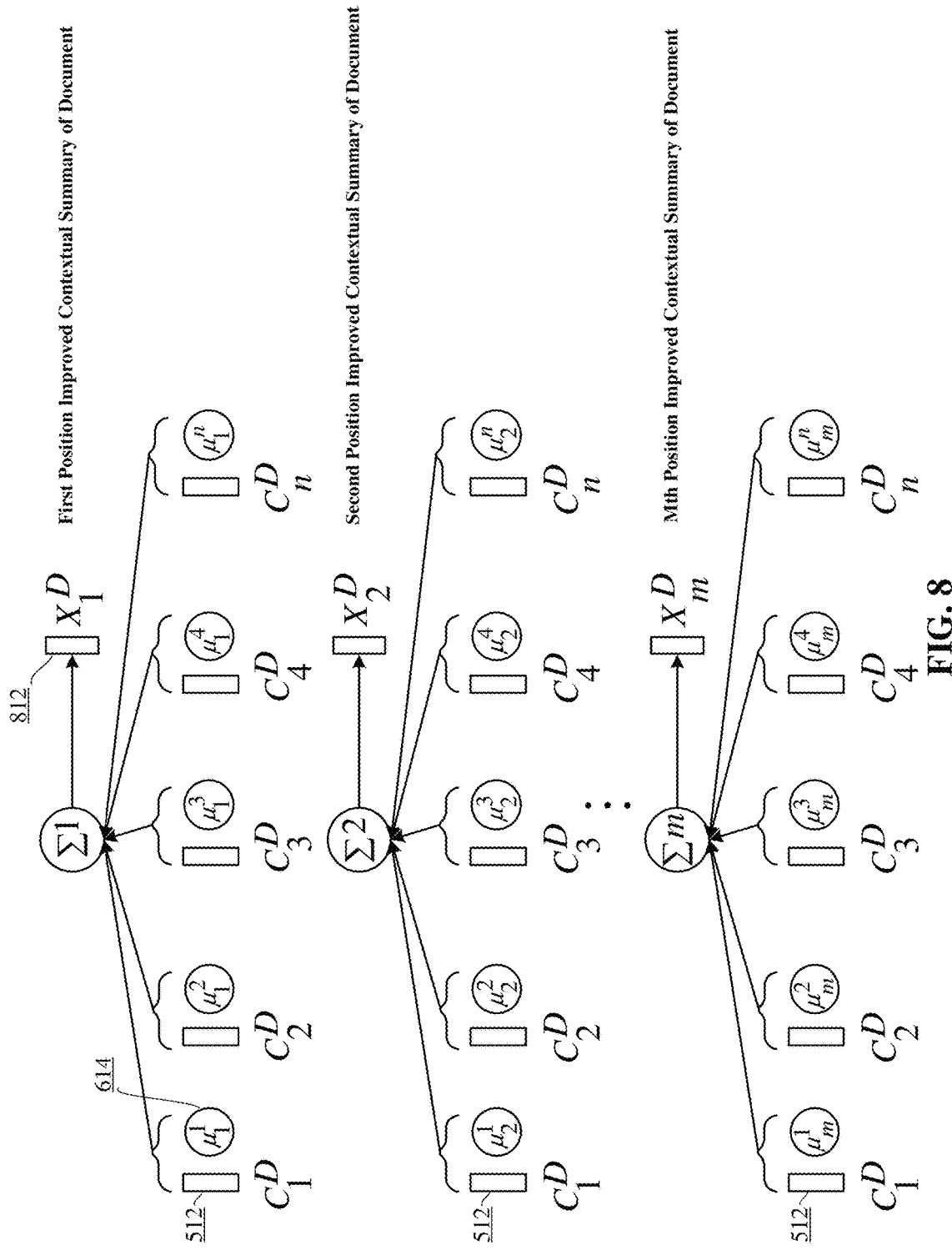
FIG. 8 depicts one implementation of generating improved contextual summaries of the document by combining FIG. 5's contextual summaries of the document with FIG. 6's question-to-document attention weights.
Figure 9:
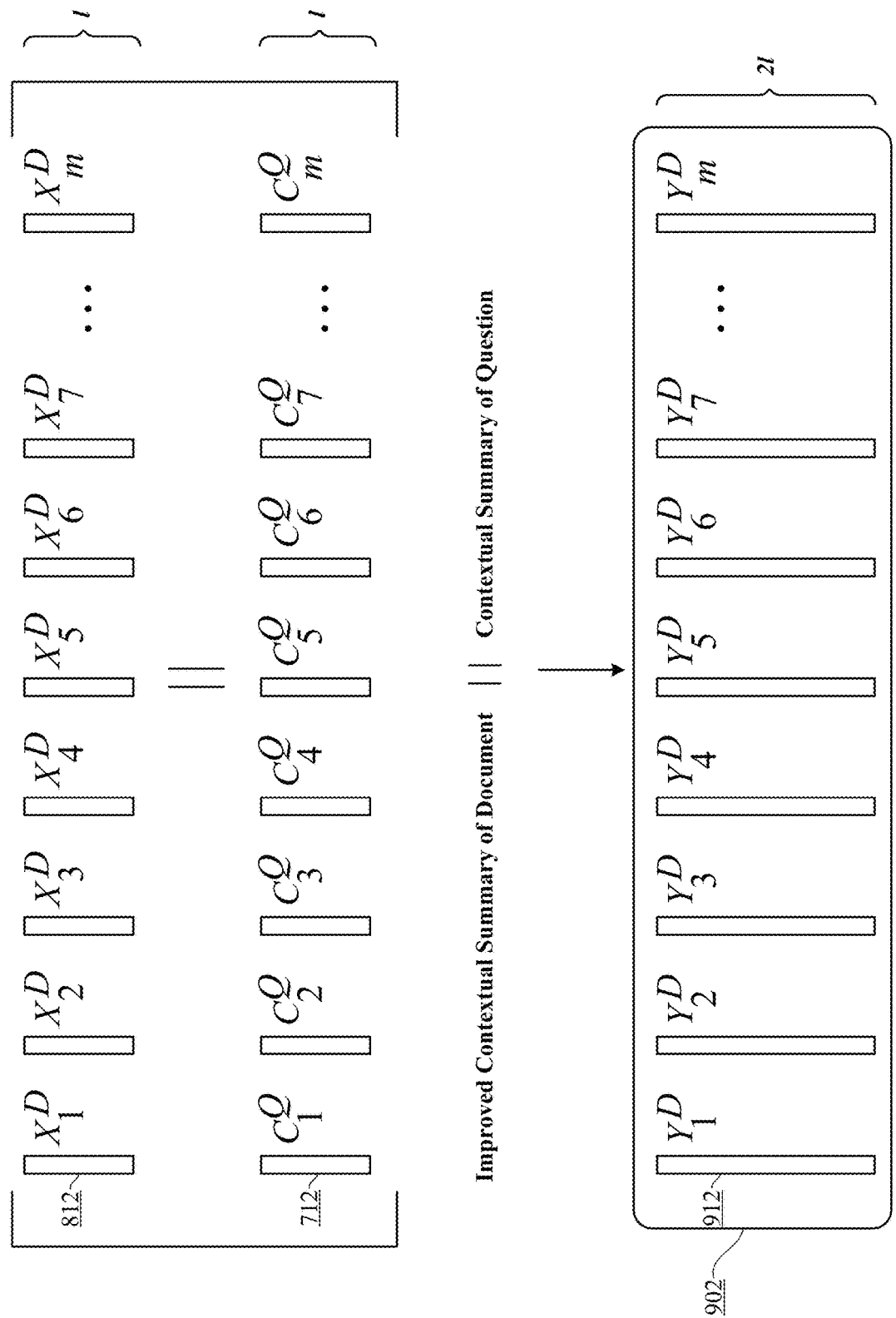
FIG. 9 is one implementation of generating a codependent representation of the document by concatenating FIG. 8's improved contextual summaries of the document with FIG. 7's contextual summaries of the question.
Figure 10:
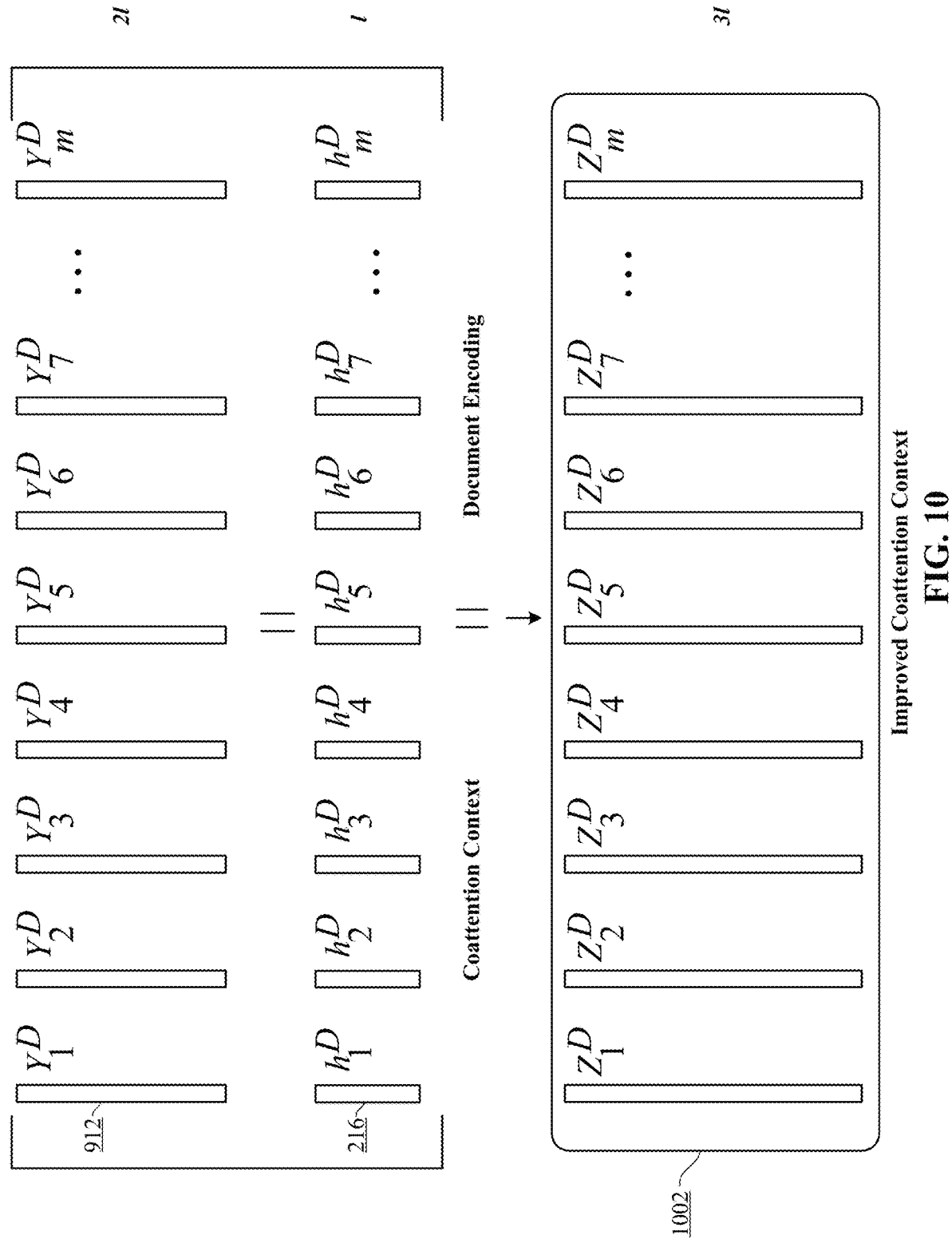
FIG. 10 shows one implementation of generating an improved codependent representation of the document by concatenating FIG. 9's codependent representation of the document with FIG. 2's document contextual encoding.
Figure 11:
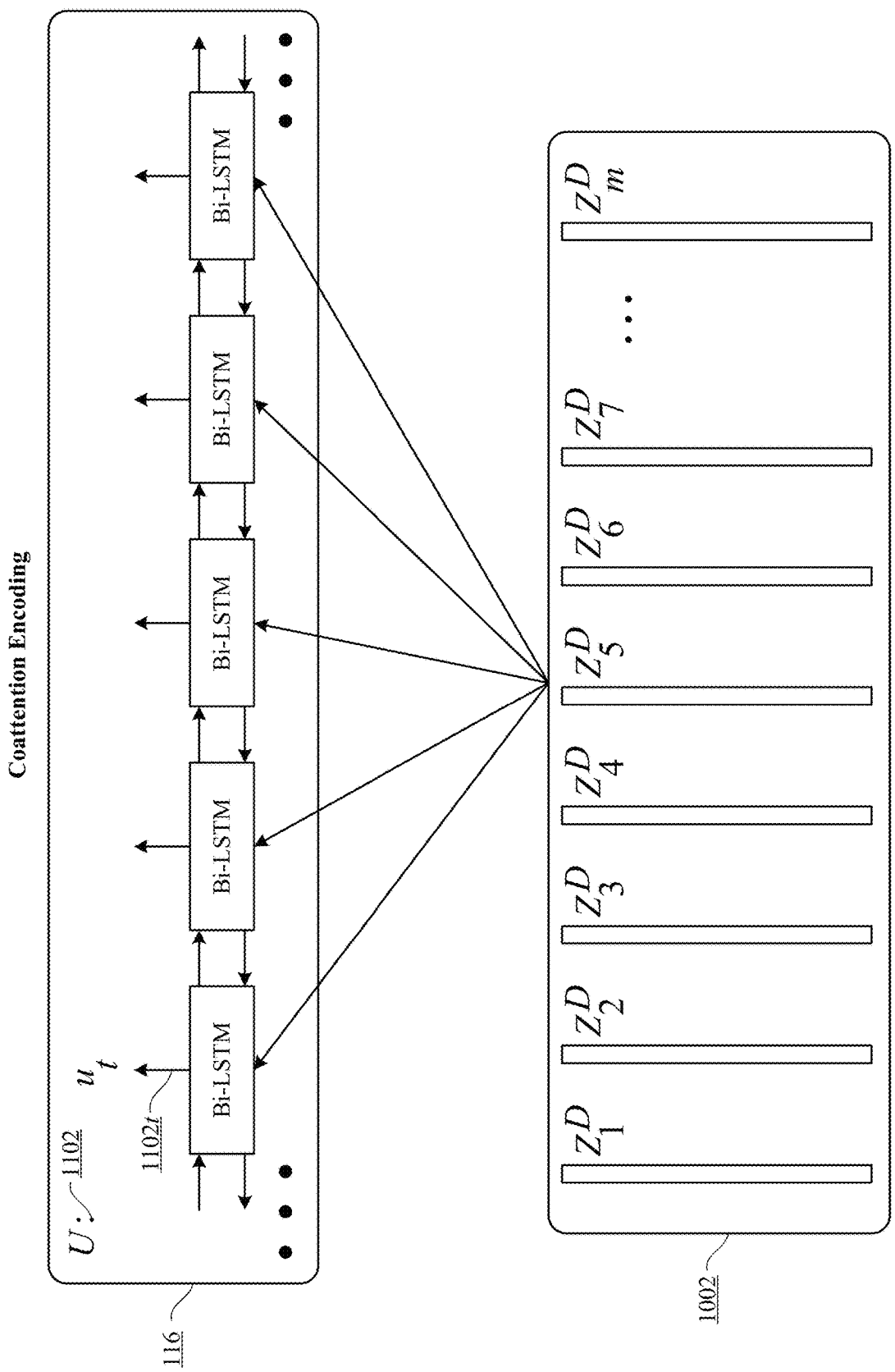
FIG. 11 illustrates one implementation of a bi-directional coattentive encoder that produces a bi-directional document-wise coattention encoding using FIG. 10's improved codependent representation of the document.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The discussion is organized as follows. First, an introduction providing an overview of the technology disclosed is presented. Then, the encoders of the technology disclosed and their functionality is discussed. Next, the coattention mechanism is discussed, followed by the decoders of the technology disclosed and their functionality. Lastly, some experimental results illustrating performance of the technology disclosed on the SQuAD dataset are provided.

Introduction

Question answering (QA) is a crucial task in natural language processing (NLP) that requires both natural language understanding and world knowledge. Previous QA datasets tend to be high in quality due to human annotation, but small in size. Hence, they did not allow for training data-intensive, expressive models such as deep neural networks.

To address this problem, researchers have developed large-scale datasets through semi-automated techniques. Compared to their smaller, hand-annotated counterparts, these QA datasets allow the training of more expressive models. However, it has been shown that they differ from more natural, human annotated datasets in the types of reasoning required to answer the questions.

Recently released Stanford Question Answering Dataset (SQuAD) is orders of magnitude larger than all previous hand-annotated datasets and has a variety of qualities that culminate in a natural QA task. SQuAD consists of questions posed by crowdworkers on a set of articles. SQuAD contains 107,785 question-answer pairs on 536 articles. SQuAD has the desirable quality that answers are spans or phrases in a reference document. This constrains the answers to the space of all possible spans in the reference document.

The technology disclosed relates to an end-to-end neural network for question answering, referred to herein as "dynamic coattention network (DCN)". Roughly described, the DCN includes an encoder neural network and a coattentive encoder that capture the interactions between a question and a document in a so-called "coattention encoding". The DCN also includes a decoder neural network and highway maxout networks that process the coattention encoding to estimate start and end positions of a phrase in the document that responds to the question.

The DCN automatically answer questions about documents. Instead of producing a single, static representation of a document without context, the DCN interprets the document differently depending on the question. That is, given the same document, the DCN constructs a different understanding depending on the question (e.g., "which team represented the NFC in Super Bowl® 50?", "who scored the touchdown in the fourth quarter?"). Based on this conditional interpretation, the DCN iteratively predicts multiple answers, allowing it to adjust initially misguided predictions.

In a single model implementation, the DCN achieves an F1 score of 75.9% on the SQuAD dataset compared to the previous state of the art with 71.0% F1 score. In an ensemble model implementation, the DCN achieves an F1 score of 80.4% on the SQuAD dataset compared to the previous state of the art with 78.1% F1 score.

Dynamic Coattention Network

FIG. 1 illustrates aspects of a dynamic coattention network (DCN) 100 that reads and comprehends a document 102*a* and answers a question 104*a* based on it. The document 102*a* is stored in a documents database 102. The question 104*a* is stored in a questions database 104. The DCN 100 comprises two types of components, namely, the encoding components (i.e., encoders) and the decoding components (i.e., decoders). The encoding components of the DCN 100 include an embedder 106, an encoder neural network 108, a hidden state comparator 110, an exponential normalizer 112, an encoding mixer 114, and a coattentive encoder 116. The decoding components of the DCN 100 include a decoder neural network 118, a start highway maxout network 120, and an end highway maxout network 122.

The components in FIG. 1 can be implemented in hardware or software, and need not be divided up in precisely the same blocks as shown in FIG. 1. Some of the components can also be implemented on different processors or computers, or spread among a number of different processors or computers. In addition, it will be appreciated that some of the components can be combined, operated in parallel or in a different sequence than that shown in FIG. 1 without affecting the functions achieved. Also as used herein, the term "component" can include "sub-components", which themselves can be considered herein to constitute components. For example, the embedder 106, the encoder neural network 108, the hidden state comparator 110, the exponential normalizer 112, the encoding mixer 114, and the coattentive encoder 116 can also be considered herein to be sub-components of an encoding component. Likewise, the decoder neural network 118, the start highway maxout network 120, and the end highway maxout network 122 can also be considered herein to be sub-components of a decoding component. Additionally, the encoding component and the decoding component can also be considered herein to be sub-components of a DCN component. Furthermore, the blocks in FIG. 1 can also be thought of as flowchart steps in a method. A component or sub-component also need not necessarily have all its code disposed contiguously in memory; some parts of the code can be separated from other parts of the code with code from other components or sub-components or other functions disposed in between.

Embedding

Embedder 106 maps each word in the document 102*a* and the question 104*a* to a high-dimensional vector space, referred to herein as the "embedding space". In one implementation, embedder 106 generates a sequence 202 of l-dimensional word vectors $x_1^D, x_2^D, \ldots, x_m^D$ corresponding to m words in the document 102*a* using an embedding matrix $E \in \mathbb{R}^{l \times |v|}$, where v represents the size of the vocabulary. Sequence 202 is referred to herein as the "document embedding". Using the same embedding matrix $E \in \mathbb{R}^{l \times |v|}$, embedder 106 also generates a sequence 204 of l-dimensional word vectors $x_1^Q, x_2^Q, \ldots, x_n^Q$ corresponding to n words in the question 104*a*. Sequence 204 is referred to herein as the "question embedding".

By sharing the embedding matrix $E \in \mathbb{R}^{l \times |v|}$, both the document 102*a* and the question 104*a* participate in the learning of the embedding space, and benefit from each other. In another implementation, embedder 106 first transforms every word in the document 102*a* and question 104*a* into one-hot representations, and then converts them into continuous representations using the shared embedding matrix $E \in \mathbb{R}^{l \times |v|}$. In yet another implementation, embedder 106 initializes the word embeddings using pre-trained word embedding models like GloVe and word2vec to obtain a fixed word embedding of each word in the document 102*a* and the question 104*a*. In other implementations, embedder 106 generates character embeddings and/or phrase embeddings.

Contextual Encoding

Encoder neural network 108 is a recurrent neural network (RNN) that incorporates contextual information into the representation of each word in the document 102*a* and the question 104*a*. In one implementation, encoder neural network 108 is a standard one-directional Long Short-Term Memory (LSTM) neural network that processes the document 102a and the question 104a separately, as shown below:

$$d_t = \text{LSTM}_{enc}(d_{t-1} x_t^D) \quad q = \text{LSTM}_{enc}(q_{t-1} x_t^Q)$$

An example LSTM neural network is described in more detail in "Generating sequences with recurrent neural networks," Alex Graves. In other implementations, encoder neural network 108 is a Gated Recurrent Unit (GRU) neural network.

The document encoding matrix $D = [d_1 \ldots d_n\ d_\varnothing] \in \mathbb{R}^{l \times (m+1)}$ and the question encoding matrix $Q' = [q_1, \ldots q_n\ a_\varnothing] \in \mathbb{R}^{l \times (n+1)}$ produce hidden state representations of the document 102a and the question 104a, where l is the dimensionality of the hidden state vectors.

In some implementations, pointer sentinel vectors $d_\varnothing$ and $q_\varnothing$ are used, which allow the encoder neural network 108 to not attend to any particular word in the input. To allow for variation between the document encoding space and the question encoding space, a non-linear projection layer is applied to the question encoding. Thus the final representation of the question becomes:

$$Q = \tan h(W^{(Q)} Q' + b^{(Q)}) \in \mathbb{R}^{l \times (n+1)}$$

Using the encoding matrices, encoder neural network 108 generates a contextual encoding 212 comprising hidden state vectors $h_1^D, h_2^D, \ldots, h_m^D$ for the document 102a based on the document embedding 202, and generates a contextual encoding 214 comprising hidden state vectors $h_1^Q, h_2^Q, \ldots, h_n^Q$ for the question 104a based on the question embedding 204. Contextual encoding 212 of the document 102a is referred to herein as the "document encoding". Contextual encoding 214 of the question 104a is referred to herein as the "question encoding". The $i^{th}$ hidden state vector $h_i^D$ (e.g., $h_4^D$) represents the $i^{th}$ word embedding (e.g., $x_4^D$) of the document 102a together with some contextual information from hidden state vectors (e.g., $h_1^D, h_2^D, h_3^D$) of preceding word embeddings (e.g., $x_1^D, x_2^D, x_3^D$) of the document 102a. Similarly, the $i^{th}$ hidden state vector $h_i^Q$ (e.g., $h_3^Q$) represents the $i^{th}$ word embedding (e.g., $x_3^D$) of the question 104a together with some contextual information from hidden state vectors (e.g., $h_1^Q, h_2^Q$) of preceding word embeddings (e.g., $x_1^Q, x_2^Q$) of the question 104a.

Coattention Mechanism

The coattention mechanism attends to the document 102a and the question 104a simultaneously, and finally fuses both attention contexts. Hidden state comparator 110 compares the document encoding 212 and the question encoding 214 using dot product and outputs an affinity matrix 302 with document-wise and question-wise dimensions, as shown below:

$$L = D^T Q \in \mathbb{R}^{(m+1) \times (n+1)},$$

where $L_{mn}$ indicates linguistic similarity between the $m^{th}$ document word and the $n^{th}$ question word.

The affinity matrix 302 identifies document-to-question affinity scores and question-to-document affinity scores corresponding to all pairs of document words and question words. Document-to-question affinity scores signify which question words are most relevant to each document word. Question-to-document affinity scores signify which document words have the closest similarity with one of the question words and are hence critical for answering the question. In the affinity matrix 302, a document-to-question affinity score for every word in the document 102a is identified as the dot product of its contextual encoding and the question encoding 214. In a transpose of the affinity matrix 302, a question-to-document affinity score for every word in the question 104a is identified as the dot product of its contextual encoding and the document encoding 212.

Exponential normalizer 112 normalizes the affinity matrix 302 document-wise by applying a row-wise softmax function 402 to the document-to-question affinity scores to produce document-to-question attention weights (γ) 404. Exponential normalizer 112 also normalizes the affinity matrix 302 question-wise by applying a column-wise softmax function 602 to the question-to-document affinity scores to produce question-to-document attention weights (μ) 604. The exponentially normalized document-to-question attention weights (γ) 404 and the exponentially normalized question-to-document attention weights (μ) 604 are attention scalars that encode the linguistic similarity calculated by the affinity scores between all pairs of document words and question words. The document-wise attention scalars $A^Q$ along each column in the affinity matrix 302 sum to unity (e.g., $\gamma_1^1$ to $\gamma_1^m$). The question-wise attention scalars $A^D$ along each row in the affinity matrix 302 sum to unity (e.g., to $\mu_1^1$ to $\mu_1^n$). The attention scalars are calculated as follows:

$$A^Q = \text{soft max}(L) \in \mathbb{R}^{(m+1) \times (n+1)}$$

$$A^D = \text{soft max}(L^T) \in \mathbb{R}^{(n+1) \times (m+1)},$$

where $L^T$ represent the transpose of the affinity matrix 302.

Encoding mixer 114 calculates a weighted sum of the document encoding 212 in dependence upon the document-to-question attention weights (γ) 404. That is, the document encoding 212 is element-wise multiplied by each column of the document-to-question attention weights (γ) 404 in the affinity matrix 302. By multiplying each document-wise attention scalar (e.g., $\gamma_1^1$ 414) by the corresponding hidden state vector (e.g., $h_1^D$ 216) in the document encoding 212, the encoding mixer 114 determines the degree of each document word's involvement in computing a contextual summary of the document 102a (e.g., $C_1^D$ 512) with respect to the question. Thus each contextual summary vector $C_1^D, C_2^D, \ldots, C_n^D$ of the document 102a indicates a weighted sum of the most important words in the document 102a with respect to the question 104a.

Similarly, encoding mixer 114 calculates a weighted sum of the question encoding 214 in dependence upon the question-to-document attention weights (μ) 604. That is, the question encoding 214 is element-wise multiplied by each row of the question-to-document attention weights (μ) 604 in the affinity matrix 302. By multiplying each question-wise attention scalar (e.g., $\mu_1^1$ 614) by the corresponding hidden state vector (e.g., $h_1^Q$ 218) in the question encoding 214, the encoding mixer 114 determines the degree of each question word's involvement in computing a contextual summary of the question 104a (e.g., $C_1^Q$ 712) with respect to the document 102a. Thus each contextual summary vector $C_1^Q, C_2^Q, \ldots, C_m^Q$ of the question 104a indicates a weighted sum of the most important words in the question 104a with respect to the document 102a.

Encoding mixer 114 then calculates a weighted sum of the contextual summaries $C_1^D, C_2^D, \ldots, C_n^D$ of the document 102a in dependence upon the question-to-document attention weights (μ) 604. That is, each row of the question-to-document attention weights (μ) 604 in the affinity matrix 302 is element-wise multiplied by each of the contextual summaries $C_1^D, C_2^D, \ldots, C_n^D$ of the document 102a. By multiplying each question-wise attention scalar (e.g., $\mu_1^1$ 614) by the corresponding contextual summary (e.g., $C_1^D$ 512) of the document 102a, the encoding mixer 114 determines the degree of each contextual summary's involvement in computing an improved contextual summary of the document 102a (e.g., $X_1^D$ 812) with respect to the question 104a. Thus each improved contextual summary vector $X_1^D$, $X_2^D$, ..., $X_m^D$ of the document 102a indicates a weighted sum of the most important contextual summaries of the document 102a with respect to the question 104a.

Encoding mixer 114 then concatenates the improved contextual summaries $X_1^D, X_2^D, \ldots, X_m^D$ of the document 102a with the contextual summaries $C_1^Q, C_2^Q, \ldots, C_m^Q$ of the question 104a to generate a codependent representation of the document 102a and the question 104a as coattention context $Y=Y_1^D, Y_2^D, \ldots, Y_m^D$ 902, where each coattention context vector has 2l dimensionality. Next, to reduce the information loss caused by earlier summarization, encoding mixer 114 element-wise concatenates the coattention context Y 902 (e.g., $Y_1^D$ 912) with the document encoding 212 (e.g., $h_1^D$ 216) to produce improved coattention context $Z_1^D$, $Z_2^D, \ldots, Z_m^D$ 1002, where each improved coattention context vector has 3l dimensionality. The improved coattention context Z 1002 is then provided as input to the coattentive encoder 116.

Coattentive encoder 116 is a bidirectional LSTM that fuses the temporal interactions between elements of the improved coattention context Z 1002 by evaluating the elements in forward and reverse directions and producing a coattention encoding U 1102. Each element (e.g., $u_t$ 1102$t$) in the coattention encoding U 1102 represents a corresponding document word encoded with respect to the question 104a. Coattention encoding U 1102 is defined as follows:

$$u_t = \text{Bi-LSTM}(u_{t-1}, u_{t+1}, [d_t; c_t^D]) \in \mathbb{R}^{2l},$$

where the coattention encoding $U=[u_1, \ldots, u_m] \in \mathbb{R}^{l \times m}$ and provides a foundation for selecting which may be the best possible answer.

Decoding

Due to the nature of SQuAD, an intuitive method for producing the answer span is by predicting the start and end points of the span. However, given a question-document pair, there may exist several intuitive answer spans within the document, each corresponding to a local maxima. To address this problem, the DCN 100 uses an iterative technique to select an answer span by predicting the start and end points of the answer span in the document. This iterative procedure allows the DCN 100 to recover from initial local maxima corresponding to incorrect answer spans.

Figure 12:
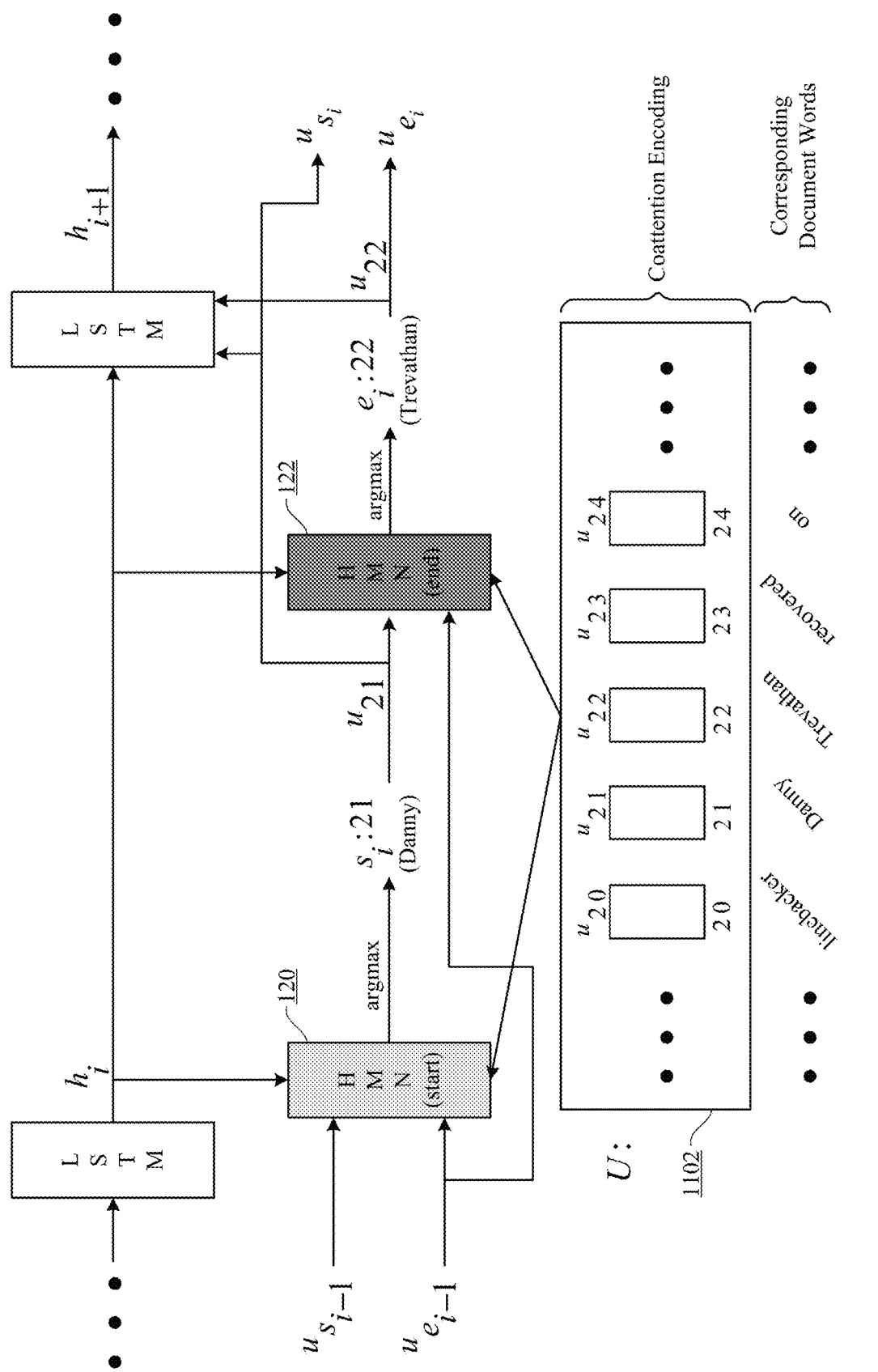
FIG. 12 depicts one implementation of a decoder neural network that iteratively predicts start and end positions a phrase in the document that responds to the question.
Figure 13:
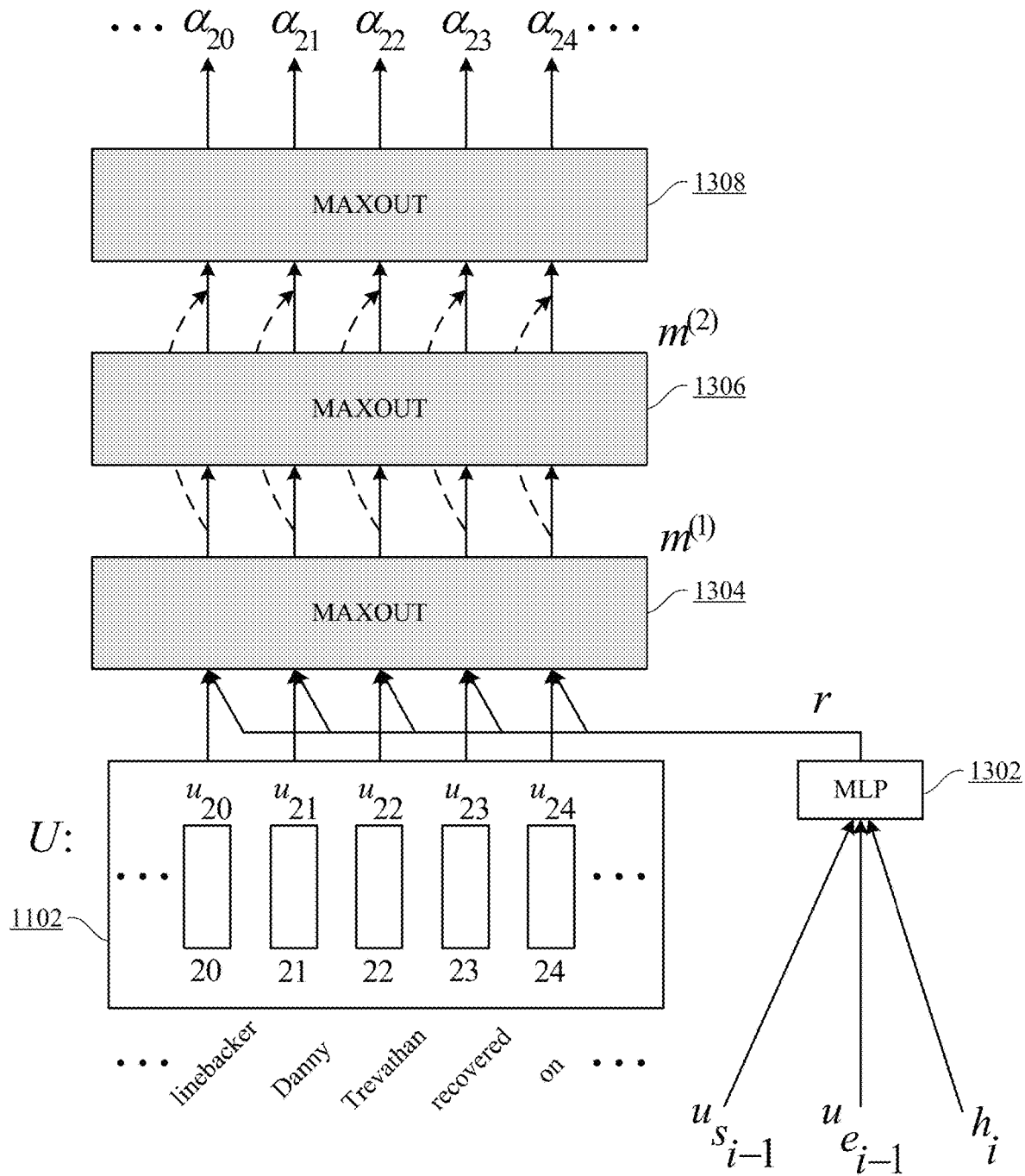
FIG. 13 is one implementation of a start highway maxout network.
Figure 14:
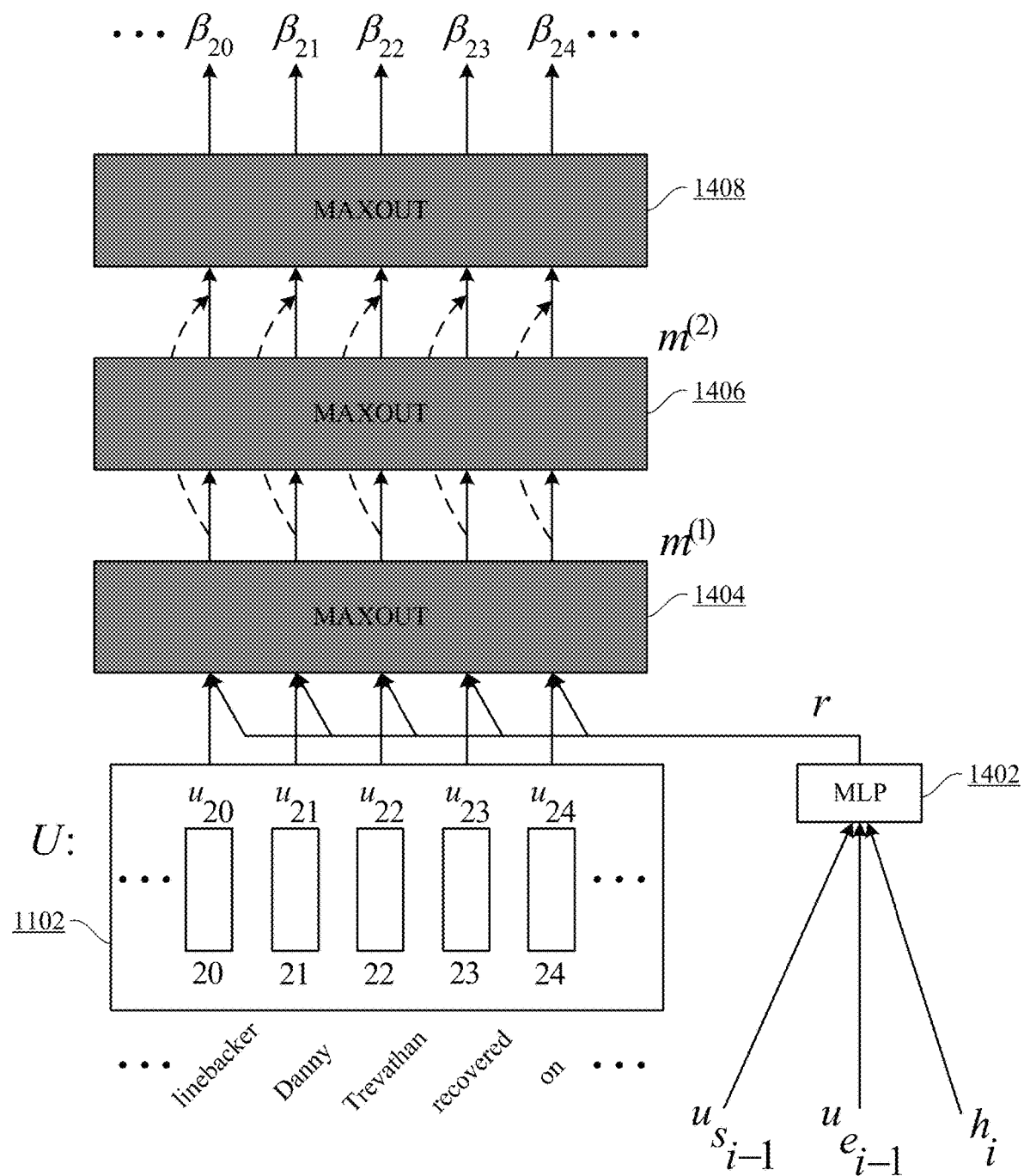
FIG. 14 is one implementation of an end highway maxout network.

FIG. 12 provides an illustration of the decoder neural network 118, which is similar to a state machine whose state is maintained by an LSTM-based sequential model. During each iteration, the decoder neural network 118 updates its state taking into account the coattention encoding corresponding to current estimates of the start and end positions, and produces, via multilayer neural networks like start highway maxout network 120 and end highway maxout network 122, new estimates of the start and end positions.

Let $h_i$, $s_i$, and $e_i$ denote the hidden state of the decoder neural network 118, the estimate of the start position, and the estimate of the end position during iteration i. The state update of the decoder neural network 118 is then described as:

$$h_i = \text{LSTM}(h_{i-1}, [u_{s_{i-1}}; u_{e_{i-1}}])$$

where $u_{s_{i-1}}$ and $u_{e_{i-1}}$ are the representations corresponding to the previous estimate of the start and end positions in the coattention encoding U 1102.

Given the current hidden state $h_i$, previous start position $u_{s_{i-1}}$, and previous end position $U_{e_{i-1}}$, the DCN 100 estimates the current start position and end position as follows:

$$s_i = \text{argmax}(\alpha_1, \ldots, \alpha_m)$$

$$e_i = \text{argmax}(\beta_1, \ldots, \beta_m),$$

where $\alpha_t$ and $\beta_t$ represent the start score and end score corresponding to the t th word in the document 102a.

The start score $\alpha_t$ is computed using the start highway maxout network 120 as follows:

$$\alpha_t = \text{HMN}_{start}(u_t, h_i, u_{s_{i-1}}, u_{e_{i-1}})$$

The end score $\beta_t$ is computed using the end highway maxout network 122 as follows:

$$\beta_t = \text{HMN}_{end}(u_t, h_i, u_{s_{i-1}}, u_{e_{i-1}})$$

In the equations above, $\mu_t$ is the coattention encoding corresponding to the t th word in the document 102a.

Both the highway maxout networks 120 and 122 take as input a non-linear projection r of the current hidden state $h_i$, previous start position $\mu_{s_{i-1}}$, and previous end position $u_{e_{i-1}}$ through a multilayer perceptron (e.g., 1302, 1402). Then, a first maxout layer (e.g., 1304, 1404) of the networks 120 and 122 combines each position $u_t$ being scored with the non-linear projection and processes each combination through four or more linear models and selects a max output $m_t^{(1)}$ from one of the linear models. Then, a second maxout layer (e.g., 1306, 1406) of the networks 120 and 122 processes, for each position $u_t$ being scored, output of the first maxout layer through four or more linear models and selects a max output $m_t^{(2)}$ from one of the linear models. Then, a third maxout layer (e.g., 1308, 1408) processes, for each position $u_t$ being scored, output of the first and second maxout layers through four or more linear models and selects a max output HMN ($u_t$, $h_i$, $u_{s_{i-1}}$, $u_{e_{i-1}}$) from one of the linear models.

The processing of the highway maxout networks 120 and 122 is described as follows:

$$\text{HMN}(u_t, h_i, u_s, u_e) = \max(W^{(3)}[m_t^{(1)}; m_t^{(2)}] + b^{(3)})$$

$$r = \tanh(W^{(D)}[h_i; u_{s_{i-1}}; u_{e_{i-1}}])$$

$$m_t^{(1)} = \max(W^{(1)}[u_t; r] + b^{(1)})$$

$$m_t^{(2)} = \max(W^{(2)} m_t^{(1)} + b^{(2)}),$$

where $r \in \mathbb{R}^l$ is a non-linear projection of the current state with parameters $W^{(D)} \in \mathbb{R}^{l \times 5l}$, $m_t^{(1)}$ is the output of the first maxout layer with parameters $W^{(1)} \in \mathbb{R}^{p \times l \times 3l}$ and $b^{(1)} \in \mathbb{R}^{p \times l}$, $m_t^{(2)}$ is the output of the second maxout layer with parameters $W^{(2)} \in \mathbb{R}^{p \times l \times l}$ and $b^{(2)} \in \mathbb{R}^{p \times l}$, $m_t^{(1)}$ and $m_t^{(2)}$ are fed into the final maxout layer, which has parameters $W^{(3)} \in \mathbb{R}^{p \times 1 \times 2l}$ and $b^{(3)} \in \mathbb{R}^p$. p is the pooling size of each maxout layer. The max operation computes the maximum value over the first dimension of a tensor. Also, there is a highway connection between the output of the first maxout layer and the last maxout layer.

In implementations, the highway maxout networks 120 and 122 share the same architecture but different parameters and hyperparameters.

To train the DCN 100, a cumulative softmax cross entropy of the start and end points is minimized across all iterations. The iterative procedure halts when both the estimate of the start position and the estimate of the end position no longer change, or when a maximum number of iterations is reached.

Other implementations of the technology disclosed include using normalizers different than, in addition to, and/or in combination with the exponential normalizer. Some examples include sigmoid based normalizers (e.g., multiclass sigmoid, piecewise ramp), hyperbolic tangent based normalizers, rectified linear unit (ReLU) based normalizers, identify based normalizers, logistic based normalizers, sine based normalizers, cosine based normalizers, unit sum based normalizers, and step based normalizers. Other examples include hierarchical softmax, differentiated softmax, importance sampling, noise contrastive estimation, negative sampling, gated softmax spherical softmax, Taylor softmax, and sparsemax. In yet other implementations, any other conventional or future-developed normalizer can be used.

Experimental Results

Figure 15:
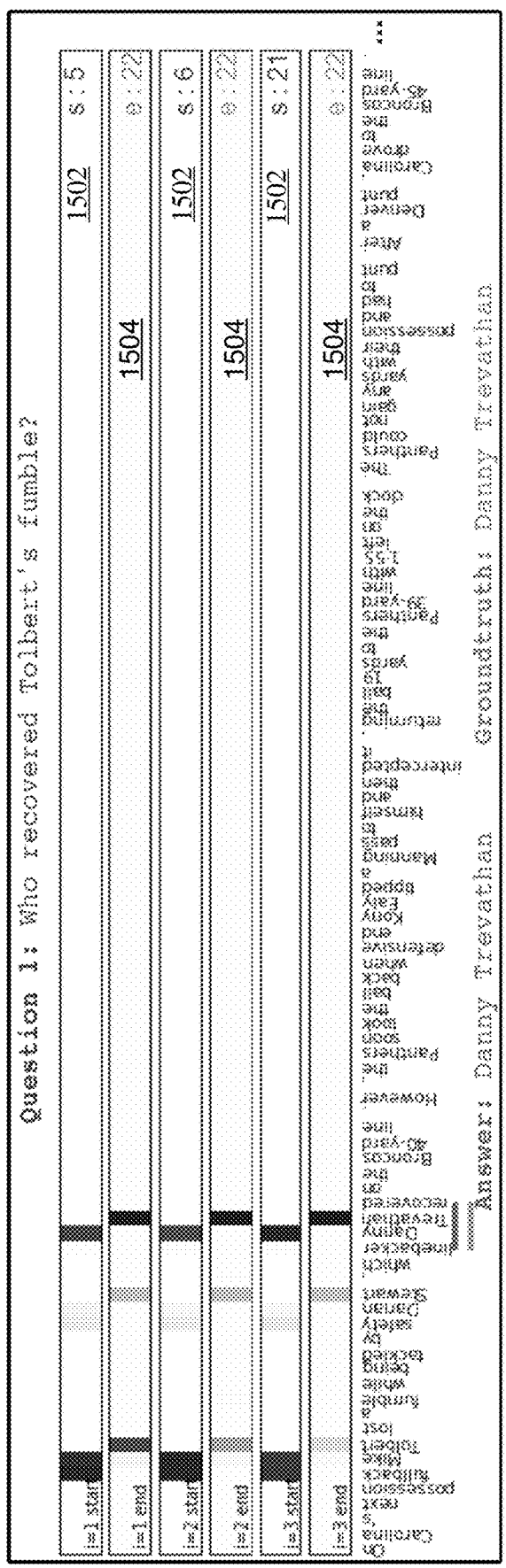
Figure 16:
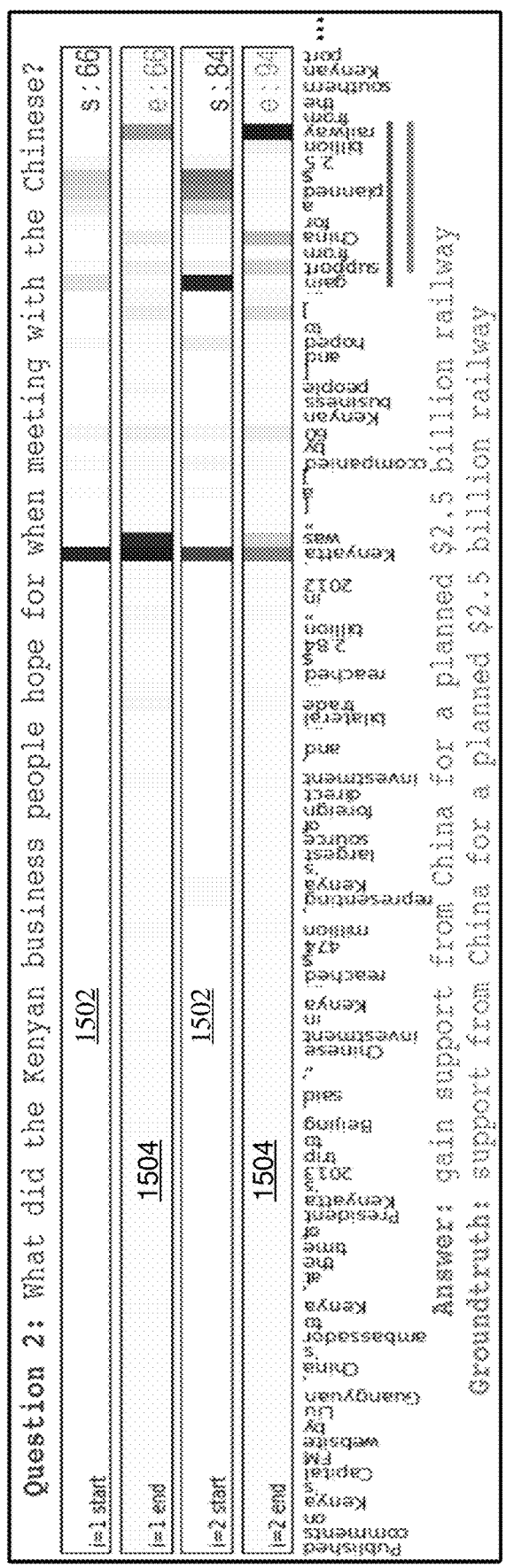
Figure 17:
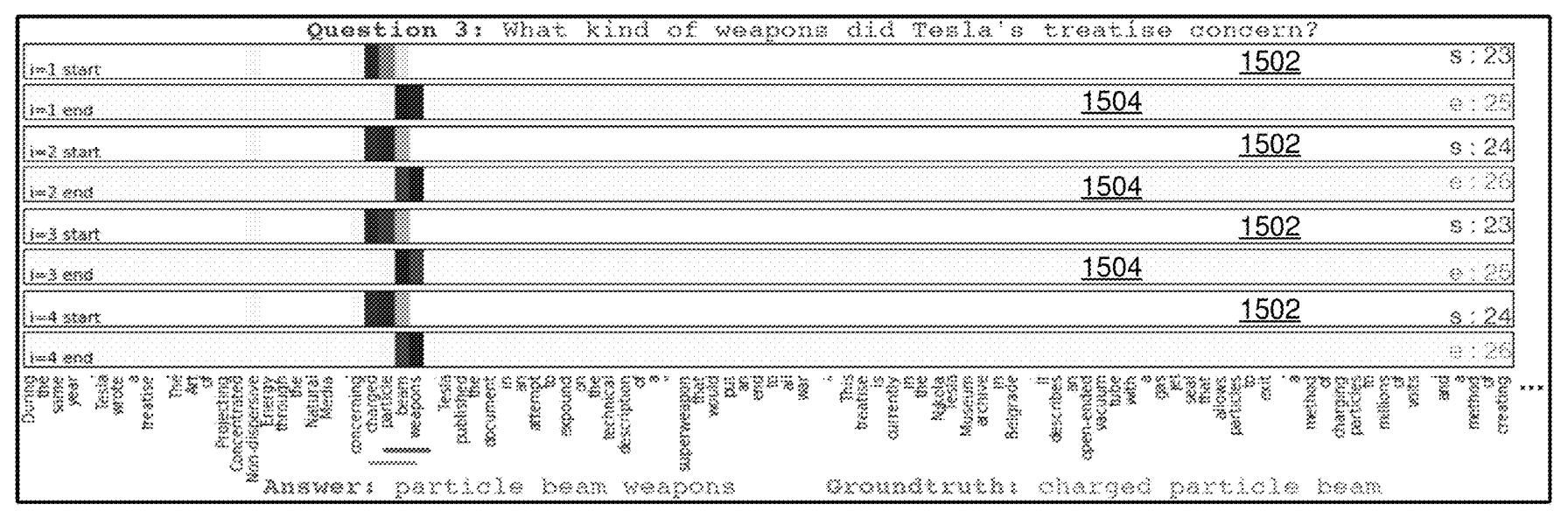

FIGS. 15-17 are examples of the start and end conditional distributions produced by the decoder neural network 118. In FIGS. 15-17, odd (blue) rows 1502 denote the start distributions and even (red) rows 1504 denote the end distributions. i indicates the iteration number of the decoder neural network 118. Higher probability mass is indicated by darker regions. The offset corresponding to the word with the highest probability mass is shown on the right hand side. The predicted span is underlined in red, and a ground truth answer span is underlined in green.

For example, question 1 in FIG. 15 demonstrates an instance where the model initially guesses an incorrect start point and a correct end point. In subsequent iterations, the DCN 100 adjusts the start point, ultimately arriving at the correct start point in iteration 3. Similarly, the model gradually shifts probability mass for the end point to the correct word.

Question 2 in FIG. 16 shows an example in which both the start and end estimates are initially incorrect. The DCN 100 then settles on the correct answer in the next iteration. While the iterative nature of the decoder neural network 118 allows the DCN 100 to escape initial local maxima corresponding to incorrect answers. Question 3 in FIG. 17 demonstrates a case where the DCN 100 is unable to decide between multiple local maxima despite several iterations. Namely, the DCN 100 alternates between the answers "charged particle beam" and "particle beam weapons" indefinitely.

Computer System

Figure 18:
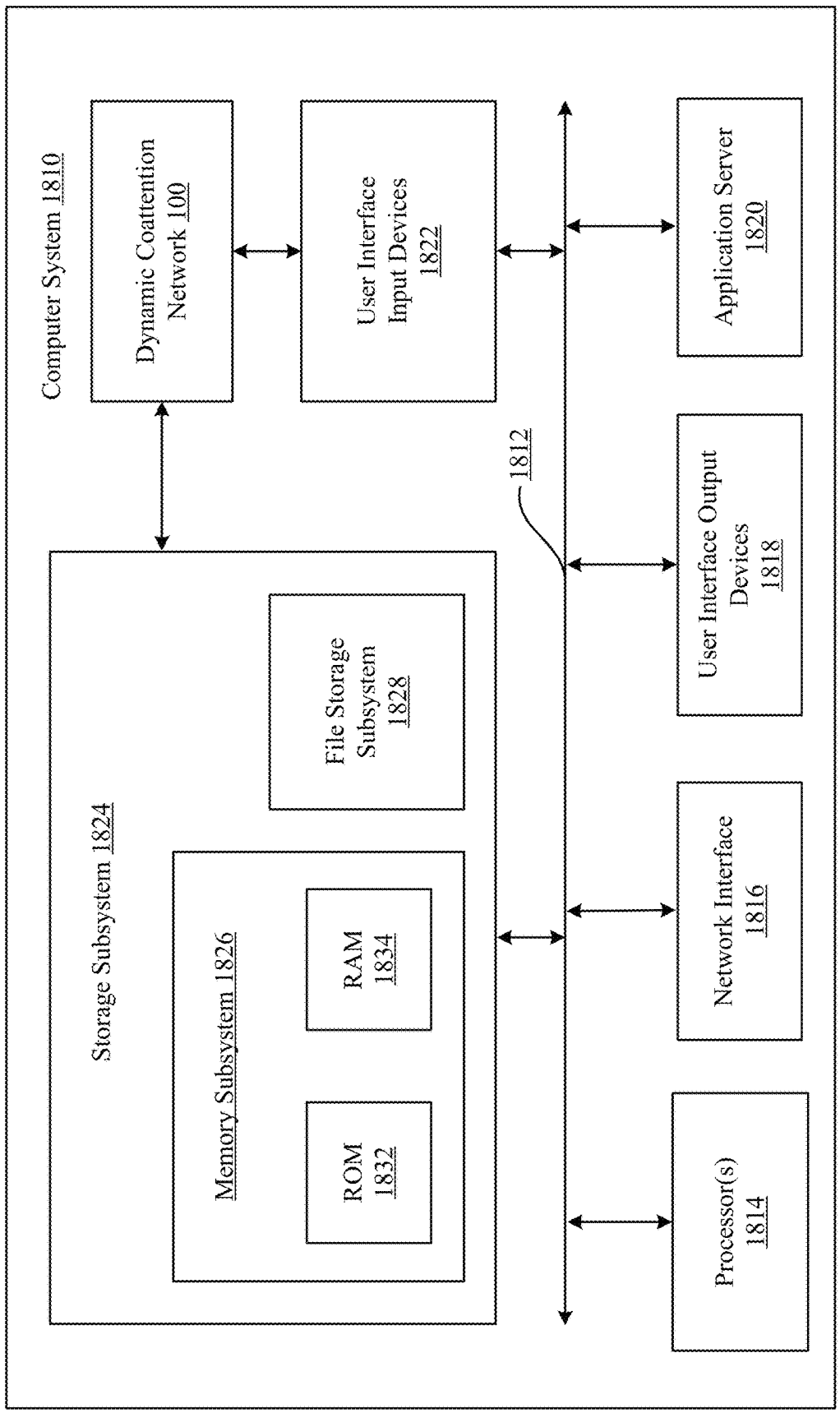
FIG. 18 is a simplified block diagram of a computer system that can be used to implement the dynamic coattention network (DCN).

FIG. 18 is a simplified block diagram of a computer system that can be used to implement the dynamic coattention network (DCN) 100. Computer system 1810 typically includes at least one processor 1814 that communicates with a number of peripheral devices via bus subsystem 1812. These peripheral devices can include a storage subsystem 1824 including, for example, memory devices and a file storage subsystem, user interface input devices 1822, user interface output devices 1818, and a network interface subsystem 1816. The input and output devices allow user interaction with computer system 1810. Network interface subsystem 1816 provides an interface to outside networks, including an interface to corresponding interface devices in other computer systems.

In one implementation, the DCN 100 is communicably linked to the storage subsystem 1824 and a user interface input devices 1822.

User interface input devices 1822 or clients or client devices can include a keyboard;

pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1810.

User interface output devices 1818 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1810 to the user or to another machine or computer system.

Storage subsystem 1824 stores programming and data constructs that provide the functionality of some or all of the modules and methods described herein. These software modules are generally executed by processor 1814 alone or in combination with other processors.

Memory 1826 used in the storage subsystem can include a number of memories including a main random access memory (RAM) 1834 for storage of instructions and data during program execution and a read only memory (ROM) 1832 in which fixed instructions are stored. A file storage subsystem 1828 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1828 in the storage subsystem 1824, or in other machines accessible by the processor.

Bus subsystem 1812 provides a mechanism for letting the various components and subsystems of computer system 1810 communicate with each other as intended. Although bus subsystem 1812 is shown schematically as a single bus, alternative implementations of the bus subsystem can use multiple busses. Application server 1820 can be a framework that allows the applications of computer system 1810 to run, such as the hardware and/or software, e.g., the operating system.

Computer system 1810 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1810 depicted in FIG. 18 is intended only as a specific example for purposes of illustrating the preferred embodiments of the present invention. Many other configurations of computer system 1810 are possible having more or less components than the computer system depicted in FIG. 18.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method for building a model used by a machine to read and comprehend a document and answer a question based on it, the method including:
   embedding the document and the question into a word embedding space;
   providing the document embedding and the question embedding to an encoder long short-term memory (LSTM) to produce a document contextual encoding and a question contextual encoding;

calculating linguistic similarity between the contextual encodings of the document and the question to produce an affinity matrix with document-wise and question-wise dimensions;

exponentially normalizing the affinity matrix document-wise and question-wise to produce respective document-to-question attention weights and question-to-document attention weights;

combining the document contextual encoding with the document-to-question attention weights, and further combining with the question-to-document attention weights to generate contextual summaries of the document;

combining the question contextual encoding with the question-to-document attention weights to generate contextual summaries of the question; and providing the contextual summaries of the document and the question and the document contextual encoding to a bi-directional LSTM to produce a bi-directional document-wise coattention encoding;

in one or more iterations, analyzing the bi-directional document-wise coattention encoding to generate document-wise hidden states and using a decoder LSTM to take into account, during second and subsequent iterations, results from an immediately prior iteration for the document-wise hidden states and estimated start and end positions previously produced;

scoring potential start positions and then potential end positions by applying separate start scoring and end scoring functions, wherein the start and end scoring functions apply to separately trained highway maxout networks that process the document-wise coattention encoding for the potential start positions and the potential end positions in the document through a linear layer and a plurality of maxout layers;

selecting among scores produced from the document-wise coattention encoding for the potential start and end positions in the document to produce currently estimated start and end positions; and upon reaching a termination condition, outputting the currently estimated start and end positions of a phrase in the document that responds to the question.

2. The method of claim 1, wherein:

the linear layer projects the document-wise hidden states and estimated start and end positions from an immediately prior iteration into a non-linear projection; and wherein the plurality of maxout layers comprise:

a first maxout layer that combines each position being scored with the non-linear projection and processes each combination through four or more linear models and selects a max output from one of the linear models;

a second maxout layer that processes, for each position being scored, the output of the first maxout layer through four or more linear models and selects a max output from one of the linear models; and a third maxout layer that processes, for each position being scored, the outputs of the first and second maxout layers through four or more linear models and selects a max output from one of the linear models.

3. The method of claim 1, wherein the termination condition is reached when the currently estimated start and end positions of the phrase match the previously estimated start and end positions.

4. The method of claim 1, wherein the termination condition is reached when a maximum number of iterations is reached.

5. The method of claim 2, further including:

training the encoder LSTM, the bi-directional LSTM, the decoder LSTM, and the highway maxout networks by minimizing a cumulative loss in estimations of start and end positions across all iterations over training examples.

6. The method of claim 5, wherein the cumulative loss is determined using softmax cross entropy.

7. A neural network system implemented by one or more computers, the neural network system comprising:

an encoder neural network that generates contextual encodings of a document and a question;

a hidden state comparator configured to generate an affinity matrix using linguistic similarity analysis between positions in the document contextual encoding and the question contextual encoding, the affinity matrix having document-wise and question-wise dimensions;

an exponential normalizer configured to normalize the affinity matrix document-wise and question-wise to produce respective document-to-question attention weights and question-to-document attention weights;

an encoding mixer configured to:

combine the document contextual encoding with the document-to-question attention weights, and further combines with the question-to-document attention weights to generate contextual summaries of the document, and combine the question contextual encoding with the question-to-document attention weights to generate contextual summaries of the question;

a coattention encoder configured to take as input the contextual summaries of the document and the question and the document contextual encoding to produce a document-wise coattention encoding; and a decoder neural network configured to:

iteratively analyze the document-wise coattention encoding to generate document-wise hidden states and use a decoder long short-term memory (LSTM) that take into account, during second and subsequent iterations, results from an immediately prior iteration for the document-wise hidden states and estimated start and end positions previously produced, score potential start positions and then potential end positions by applying separate start scoring and end scoring functions, wherein the start scoring and end scoring functions apply to separately trained highway maxout networks that process the document-wise coattention encoding for the potential start and end positions in the document through a linear layer and a plurality of maxout layers, select among scores produced from the document-wise coattention encoding for the potential start and end positions in the document to produce currently estimated start and end positions, and upon reaching a termination condition, output the currently estimated start and end positions of a phrase in the document that responds to the question.

8. The system of claim 7, wherein:

the linear layer is configured to project the document-wise hidden states and estimated start and end positions from an immediately prior iteration into a non-linear projection; and wherein the plurality of maxout layers comprise:
  a first maxout layer configured to combine each position being scored with the non-linear projection and processes each combination through four or more linear models and select a max output from one of the linear models;
  a second maxout layer configured to process, for each position being scored, output of the first maxout layer through four or more linear models and select a max output from one of the linear models; and
  a third maxout layer configured to process, for each position being scored, outputs of the first and second maxout layers through four or more linear models and select a max output from one of the linear models.

9. The system of claim 7, wherein the termination condition is reached when the currently estimated start and end positions of the phrase match the previously estimated start and end positions.

10. The system of claim 7, wherein the termination condition is reached when a maximum number of iterations is reached.

11. The system of claim 7, further configured to:
  train the encoder neural network, the coattention encoder, and the decoder neural network by minimizing a cumulative loss in estimations of start and end positions across all iterations over training examples.

12. The system of claim 11, wherein the cumulative loss is determined using softmax cross entropy.

13. The system of claim 7, wherein the coattention encoder is a bi-directional LSTM.

14. A non-transitory computer readable storage medium impressed with computer program instructions to build a model used by a machine to read and comprehend a document and answer a question based on it, the instructions, when executed on a processor, implement a method comprising:
  embedding the document and the question into a word embedding space;
  providing the document embedding and the question embedding to an encoder LSTM to produce a document contextual encoding and a question contextual encoding;
  calculating linguistic similarity between the contextual encodings of the document and the question to produce an affinity matrix with document-wise and question-wise dimensions;
  exponentially normalizing the affinity matrix document-wise and question-wise to produce respective document-to-question attention weights and question-to-document attention weights;
  combining the document contextual encoding with the document-to-question attention weights, and further combining with the question-to-document attention weights to generate contextual summaries of the document; combining the question contextual encoding with the question-to-document attention weights to generate contextual summaries of the question; and
  providing the contextual summaries of the document and the question and the document contextual encoding to a bi-directional LSTM to produce a bi-directional document-wise coattention encoding in one or more iterations, analyzing the bi-directional document-wise coattention encoding to generate document-wise hidden states, additionally using a decoder LSTM to take into account, during second and subsequent iterations, results from an immediately prior iteration for the document-wise hidden states and estimated start and end positions previously produced;
  scoring potential start positions and then potential end positions by applying separate start scoring and end scoring functions, wherein the start and end scoring functions apply to separately trained highway maxout networks that process the document-wise coattention encoding for the potential start and end positions in the document through a linear layer and a plurality of maxout layers;
  selecting among scores produced from the document-wise coattention encoding for the potential start and end positions in the document to produce currently estimated start and end positions; and
  upon reaching a termination condition, outputting the currently estimated start and end positions of a phrase in the document that responds to the question.

15. The non-transitory computer readable storage medium of claim 14, wherein
  the linear layer is configured to project the document-wise hidden states and estimated start and end positions from an immediately prior iteration into a non-linear projection; and
  wherein the plurality of maxout layers comprise:
  a first maxout layer configured to combine each position being scored with the non-linear projection and processes each combination through four or more linear models and selects a max output from one of the linear models;
  a second maxout layer configured to process, for each position being scored, output of the first maxout layer through four or more linear models and select a max output from one of the linear models; and
  a third maxout layer configured to process, for each position being scored, outputs of the first and second maxout layers through four or more linear models and select a max output from one of the linear models.

16. The non-transitory computer readable storage medium of claim 14, wherein the termination condition is reached when the currently estimated start and end positions of the phrase match the previously estimated start and end positions.

17. The non-transitory computer readable storage medium of claim 14, wherein the termination condition is reached when a maximum number of iterations is reached.

18. The non-transitory computer readable storage medium of claim 15, implementing the method further comprising:
  training the encoder LSTM, the bi-directional LSTM, the decoder LSTM, and the highway maxout networks by minimizing a cumulative loss in estimations of start and end positions across all iterations over training examples.

* * * * *